US011346248B2

(12) United States Patent
Bulsiewics et al.

(10) Patent No.: US 11,346,248 B2
(45) Date of Patent: May 31, 2022

(54) TURBINE NOZZLE SEGMENT AND A TURBINE NOZZLE COMPRISING SUCH A TURBINE NOZZLE SEGMENT

(71) Applicant: General Electric Company Polska sp. z o. o., Warsaw (PL)

(72) Inventors: Tomasz Bulsiewics, Warsaw (PL); Leszek Marek Rzeszutek, Warsaw (PL); Maciej Michal Stańczyk, Warsaw (PL); Dariusz Olczak, Warsaw (PL); Jaroslaw Stec, Warsaw (PL)

(73) Assignee: General Electric Company Polska Sp. Z o.o., Warsaw (PL)

( * ) Notice: Subject to any disclaimer, the term of this patent is extended or adjusted under 35 U.S.C. 154(b) by 0 days.

(21) Appl. No.: 17/166,550

(22) Filed: Feb. 3, 2021

(65) Prior Publication Data
US 2021/0246810 A1    Aug. 12, 2021

(30) Foreign Application Priority Data

Feb. 10, 2020   (EP) .................................. 204615108

(51) Int. Cl.
*F01D 5/18*  (2006.01)
*F01D 25/12* (2006.01)
*F01D 9/04*  (2006.01)

(52) U.S. Cl.
CPC ............. *F01D 25/12* (2013.01); *F01D 5/187* (2013.01); *F01D 5/189* (2013.01); *F01D 9/04* (2013.01);
(Continued)

(58) Field of Classification Search
CPC .......... F01D 5/186; F01D 5/187; F01D 5/188; F01D 5/189
See application file for complete search history.

(56) References Cited

U.S. PATENT DOCUMENTS

| | | | | |
|---|---|---|---|---|
| 3,807,892 A | * | 4/1974 | Frei ......................... | F01D 5/187 |
| | | | | 415/116 |
| 4,278,400 A | * | 7/1981 | Yamarik ................. | F01D 5/187 |
| | | | | 415/115 |

(Continued)

FOREIGN PATENT DOCUMENTS

| | | |
|---|---|---|
| EP | 3002412 A1 | 4/2016 |
| EP | 3070265 A1 | 9/2016 |

OTHER PUBLICATIONS

Extended European Search Report corresponding to EP Application No. 20461510.8 dated Apr. 21, 2020.

*Primary Examiner* — Woody A Lee, Jr.
*Assistant Examiner* — Behnoush Haghighian
(74) *Attorney, Agent, or Firm* — McGarry Bair PC

(57) ABSTRACT

A nozzle segment for a gas turbine engine comprises an outer band having a cooling air inlet, an inner band having a first cooling air outlet, and a nozzle airfoil comprising a cooling flow passage arranged to receive the cooling air as a cooling air stream. A first channel and a second channel are arranged within the cooling flow passage. A deflector is arranged to divide the cooling air stream into a first cooling air stream in the first channel and a second cooling air stream in the second channel, respectively. The deflector deflects the first cooling air stream obliquely to a suction sidewall in the first channel, wherein the first channel is configured to transport the first cooling air stream along the first channel in a swirly flow.

20 Claims, 14 Drawing Sheets

A-A

(52) U.S. Cl.
CPC .......... *F01D 5/188* (2013.01); *F05D 2220/32* (2013.01); *F05D 2240/128* (2013.01); *F05D 2260/201* (2013.01); *F05D 2260/202* (2013.01)

(56) References Cited

U.S. PATENT DOCUMENTS

| | | | | |
|---|---|---|---|---|
| 4,604,031 A * | 8/1986 | Moss | ...................... | F01D 5/187 416/97 R |
| 4,992,026 A * | 2/1991 | Ohtomo | .................. | F01D 5/187 415/115 |
| 5,462,405 A * | 10/1995 | Hoff | ...................... | F01D 5/187 416/97 R |
| 5,498,126 A * | 3/1996 | Pighetti | .................. | F01D 9/065 415/115 |
| 5,507,621 A * | 4/1996 | Cooper | .................. | F01D 5/187 416/97 R |
| 5,511,309 A * | 4/1996 | Beabout | .................. | F01D 5/187 29/889.72 |
| 5,669,759 A * | 9/1997 | Beabout | .................. | F01D 5/187 416/97 R |
| 5,688,104 A * | 11/1997 | Beabout | .................. | F01D 5/187 415/115 |
| 5,772,397 A * | 6/1998 | Morris | .................. | F01D 5/187 415/115 |
| 5,842,829 A * | 12/1998 | Cunha | .................... | F01D 5/186 415/115 |
| 5,857,837 A * | 1/1999 | Zelesky | .................. | F01D 5/187 416/97 R |
| 6,132,169 A * | 10/2000 | Manning | ................ | F01D 5/187 415/115 |
| 6,183,194 B1 * | 2/2001 | Cunha | .................... | F01D 5/187 415/115 |
| 6,257,830 B1 * | 7/2001 | Matsuura | ................ | F01D 5/147 415/115 |
| 6,422,817 B1 * | 7/2002 | Jacala | .................... | F01D 5/187 416/96 R |
| 6,631,561 B1 * | 10/2003 | Anding | .................... | F01D 5/18 29/889.72 |
| 6,939,102 B2 * | 9/2005 | Liang | .................... | F01D 5/188 415/115 |
| 6,974,308 B2 * | 12/2005 | Halfmann | ............... | F01D 5/187 416/97 R |
| 6,984,101 B2 * | 1/2006 | Schiavo, Jr. | ........... | F01D 5/187 415/115 |
| 7,137,784 B2 * | 11/2006 | Hall | ........................ | F01D 5/187 416/97 R |
| 7,303,372 B2 * | 12/2007 | West | ...................... | F01D 9/065 415/208.1 |
| 7,600,973 B2 * | 10/2009 | Tibbott | .................. | F01D 5/187 416/189 |
| 7,625,178 B2 * | 12/2009 | Morris | ..................... | B22C 9/10 416/97 R |
| 7,918,647 B1 * | 4/2011 | Liang | ...................... | F01D 5/188 416/96 A |
| 8,011,888 B1 * | 9/2011 | Liang | ...................... | F01D 5/186 416/92 |
| 8,142,153 B1 * | 3/2012 | Liang | ........................ | F01D 9/04 416/1 |
| 8,221,055 B1 * | 7/2012 | Liang | ...................... | F01D 5/187 415/115 |
| 8,757,961 B1 * | 6/2014 | Liang | ...................... | F01D 5/185 415/115 |
| 8,827,632 B1 * | 9/2014 | Lee | .......................... | F01D 5/188 415/115 |
| 8,864,438 B1 * | 10/2014 | Lee | .......................... | F01D 5/188 415/1 |
| 8,864,468 B1 * | 10/2014 | Liang | ...................... | F01D 9/041 416/97 R |
| 8,985,940 B2 * | 3/2015 | Zhang | ...................... | F01D 25/08 415/115 |
| 9,017,025 B2 * | 4/2015 | Lee | .......................... | F01D 5/187 416/97 R |
| 9,359,902 B2 * | 6/2016 | Campbell, Jr. | .......... | F01D 5/187 |
| 9,631,499 B2 * | 4/2017 | Liang | ...................... | F01D 25/12 |
| 9,797,261 B2 * | 10/2017 | Tibbott | .................. | F01D 9/065 |
| 9,840,930 B2 * | 12/2017 | Lee | .......................... | F01D 5/187 |
| 10,196,906 B2 * | 2/2019 | Lee | .......................... | F01D 5/187 |
| 10,260,359 B2 * | 4/2019 | Groom | .................... | F01D 9/023 |
| 10,563,521 B2 * | 2/2020 | Clum | ...................... | F01D 5/147 |
| 10,570,773 B2 * | 2/2020 | Synnott | ........................ | F01D 9/04 |
| 10,619,489 B2 * | 4/2020 | Spangler | ................. | F01D 5/187 |
| 10,655,476 B2 * | 5/2020 | Halfmann | ............... | F01D 5/187 |
| 10,718,219 B2 * | 7/2020 | Meier | .................... | F01D 5/081 |
| 10,731,478 B2 * | 8/2020 | Xu | .......................... | F01D 5/188 |
| 11,028,702 B2 * | 6/2021 | Propheter-Hinckley | ..................... | F01D 9/041 |
| 11,118,475 B2 * | 9/2021 | Synnott | .................... | B22C 9/10 |
| 2004/0076519 A1 * | 4/2004 | Halfmann | ............... | B22C 9/103 416/97 R |
| 2005/0013686 A1 * | 1/2005 | Schiavo | .................. | F01D 5/187 415/115 |
| 2005/0042096 A1 * | 2/2005 | Hall | ...................... | F01D 5/187 416/97 R |
| 2005/0069414 A1 * | 3/2005 | Liang | ...................... | F01D 5/188 416/97 R |
| 2007/0116562 A1 * | 5/2007 | West | ...................... | F01D 5/187 415/208.1 |
| 2008/0286115 A1 * | 11/2008 | Liang | ...................... | F01D 5/188 416/97 R |
| 2010/0054915 A1 * | 3/2010 | Devore | .................... | F01D 5/189 415/116 |
| 2012/0207614 A1 * | 8/2012 | Lee | ........................ | F01D 5/187 416/97 R |
| 2013/0259704 A1 * | 10/2013 | Zhang | .................... | F01D 25/08 416/97 R |
| 2015/0003999 A1 * | 1/2015 | Campbell, Jr. | .......... | F01D 5/186 416/97 R |
| 2016/0097286 A1 * | 4/2016 | Tibbott | .................... | F01D 5/189 415/1 |
| 2016/0273371 A1 * | 9/2016 | Groom | .................... | F01D 5/189 |
| 2016/0362986 A1 * | 12/2016 | Liang | ...................... | F01D 5/187 |
| 2018/0156045 A1 * | 6/2018 | Clum | ...................... | F01D 5/147 |
| 2019/0186273 A1 * | 6/2019 | Halfmann | ............... | F01D 5/187 |
| 2020/0102840 A1 * | 4/2020 | Bae | ........................ | F01D 5/081 |

* cited by examiner

A-A

TURBINE NOZZLE SEGMENT AND A TURBINE NOZZLE COMPRISING SUCH A TURBINE NOZZLE SEGMENT

CROSS REFERENCE TO RELATED APPLICATION(S)

This application claims priority to and benefit of E.P. Patent Application No. 20461510.8 filed Feb. 10, 2020, which is incorporated herein in its entirety.

TECHNICAL FIELD

The present disclosure is related to a nozzle segment for a gas turbine engine. More specifically the present disclosure is related in particular to a nozzle segment for a gas turbine engine comprising a high pressure turbine. The present disclosure is also related to a second stage turbine nozzle of a high pressure turbine of a gas turbine engine, especially for a small gas turbine engine. The present disclosure is further related to a turbine nozzle comprising such a turbine nozzle segment. More specifically the present disclosure is related to a high pressure turbine nozzle comprising such a high pressure turbine nozzle segment.

BACKGROUND

In brief, a gas turbine engine comprises a compressor, a combustor and a turbine. The compressor is provided to intake surrounding air into the engine, compress said air and feed compressed air to the combustor. The compressed air is then mixed in the combustor with the fuel to provide an air-fuel mixture. The air-fuel mixture is burned in the combustor, providing hot high-energy combustion gases. The combustion gases are fed further from the combustor to the turbine for extracting energy from the hot high energy combustion gases to power the gas turbine engine. The combustion gases depleted from energy are then discharged to the atmosphere downstream of the turbine.

The turbine in a modern gas turbine engine comprises a high pressure turbine (HPT) and a low pressure turbine (LPT). The HPT is just downstream of the combustor and is adapted to extract energy from the combustion gases for powering the compressor. The LPT is arranged further downstream of the HPT and said LPT is adapted to extract further energy from the combustion gases for producing output work, such as for example powering an upstream fan in a turbofan engine, a turboprop propeller or a helicopter rotor via a gearbox.

A turbine comprises a stationary nozzle having a row of nozzle airfoils for directing the combustion gases into corresponding row of turbine rotor blades extending radially outward from a supporting rotor disc. In most cases a row of nozzle airfoils is provided as a row of nozzle segments. The nozzle airfoils and the corresponding rotor blades cooperate for extracting energy from the combustion gases. The energy is used to rotate a supporting rotor disc. The supporting rotor disk of the turbine is joined via a corresponding shaft with either a compressor rotor or a fan rotor for rotating the corresponding blades thereof by rotating the supporting disk of the turbine.

The above described components of the gas turbine engine define an annular flow path of combustion gases. The annular flow path extends downstream between the corresponding rows of nozzle airfoils and rotor blades of the turbine. Since the combustion gases fed from the combustor are hot, the components defining the flow path have to be cooled during operation of the engine to ensure intended operational life of the turbine. Because the HPT is arranged in the gas turbine engine essentially as the first component of the turbine downstream of the combustor, said HPT receives the hottest combustion gases. The components of the HPT, therefore, are subjected to extreme temperatures. As a consequence, the components of the HPT have to be adequately configured for enhanced cooling to assure intended operational temperature of said components of the HPT. Because of that, there are specific goals necessary to be achieved in terms of cooling, when designing the HPT.

The components of the turbine of the gas turbine engine, especially the components defining the flow path of the combustion gases, particularly nozzles, are cooled with air. The air for cooling the components of the turbine is provided in a modern gas turbine engine by the compressor, the air being bled from said compressor as compressor air. The air provided by the compressor for cooling the components of the turbine is not used in the combustion of the fuel. Because of that, bleeding air from the compressor for cooling the components of the turbine decreases the overall efficiency of the gas turbine engine. Therefore, in order to minimize decrease of the efficiency of the gas turbine engine the volume of the compressor air bled from the compressor for cooling the turbine, especially the components defining a flow path of the combustion gases, needs to be minimized.

The compressor air for cooling the turbine is provided by the compressor under the maximum pressure. Said compressor air has to be channeled through the components of the turbine of the gas turbine engine, respectively, to cool said components to ensure their intended operational temperature. The flow of the cooling air through the components of the turbine to be cooled causes a pressure loss of the compressor air. In other words, the pressure of the cooling air leaving the components to be cooled is lower than the pressure of the air entering said components. The pressure loss, as discussed above, needs to be minimized to ensure a backflow margin. It means that the pressure of cooling air leaving the components of the turbine to be cooled into the flow path of the combustion gases has to be greater that the pressure of said combustion gases in said flow path. Ensuring the backflow margin prevents the combustion gases to flow back into the components of the turbine disturbing cooling of said components of the turbine of the gas turbine engine, decreasing thereby their operational life.

Therefore, upon development of components of a turbine of a gas turbine engine, especially turbine nozzles, specific design goals need to be achieved, the goals being often competing. One goal is to provide components of the turbine having increased operational life. One of attempts for achieving improved operational life is improving cooling of said component, especially cooling the turbine nozzles. The competing goal is to minimize an amount of cooling air bled from a compressor as compressor air in order to minimize decrease of efficiency of the gas turbine engine. The other goal is to provide also adequate backflow margin to prevent backflow of combustion gases into the component of the turbine to be cooled, especially to prevent backflow of said combustion gases into the turbine nozzles. Because of the above the balanced attitude for designing components of the turbine is necessary.

Some efforts to solve the above specified problems of cooling of components of a turbine have been already made.

The document No. U.S. Pat. No. 5,772,397 discloses a gas turbine vane or blade having an internal structure that allows for cooling under diverse pressure ratios. The vane comprises an inlet passage that communicates with an inner cooling cavity positioned between the air passage and the vane's trailing edge. Disposed within the cavity are deflectors, turning members, ribs, and deflecting pins arranged so as to direct the cooling air through the cavity in a manner that minimizes pressure loss.

The document No. U.S. Pat. No. 3,807,892 discloses a cooled guide blade for a gas turbine. The body of said blade is provided with a first coolant flow path at the front of the blade and a second torturous coolant flow path behind the first flow path. Both flow paths terminate at the trailing edge of the blade. The first path is subjected to a low pressure drop and with a narrow cross-section allows the coolant to flow through at high velocity to obtain a rapid heat transfer. The second path is also subjected to a low pressure drop, but with a larger cross-section in the middle part of the blade body and restrictors at the trailing edge, also allows discharge at high velocity.

The document U.S. Pat. No. 6,884,036 discloses a complementary cooled turbine nozzle. The turbine nozzle includes outer and inner bands integrally joined to a vane having a three-pass serpentine flow circuit between opposite pressure and suction sidewalls. The outer band includes an inlet for channeling cooling air into a first channel of the circuit located behind a leading edge of the vane. A first outlet is disposed in the inner band at the bottom of the first channel where it joins the second channel of the circuit. A second outlet is also disposed in the inner band at the bottom of a third channel of the circuit which is disposed in flow communication with the second channel. The first channel behind the leading edge is smooth except for corresponding rows of first and second turbulators spaced laterally apart. The first turbulators bridge the pressure and suction sidewalls directly behind the leading edge, and the second turbulators are disposed behind the suction sidewall.

Nonetheless, the technical solutions, as disclosed in the above documents, are still insufficient in performance, especially in a small gas turbine engine.

Therefore, there is still a demand for a nozzle segment for a turbine nozzle of a gas turbine engine, especially for a nozzle segment for a HPT for a small gas turbine engine, solving or at least diminishing problems of the technical solutions of the state of the art.

BRIEF DESCRIPTION

An aspect of the present disclosure relates to a nozzle segment for a gas turbine engine. The nozzle comprises an outer band comprising a cooling air inlet, an inner band comprising a first cooling air outlet, and at least one nozzle airfoil comprising a pressure sidewall, a suction sidewall, a leading edge and a trailing edge. The pressure sidewall and the suction sidewall are spaced apart and extend in span between the outer band and the inner band and in chord between a leading edge and a trailing edge, the nozzle airfoil comprises a cooling bores arranged within the trailing edge. The nozzle further comprises a cooling flow passage arranged at least within the nozzle airfoil for cooling said nozzle airfoil with cooling air, wherein the cooling flow passage is in a fluid communication with the cooling air inlet for delivering cooling air into the cooling flow passage as a cooling air stream, and a first integral rib protruding from the inner band and arranged spaced apart from the leading edge for defining a first channel and a second channel within the cooling flow passage. The first channel is arranged along the leading edge and is in a fluid communication with the first cooling air outlet for discharging cooling air from the first channel of the cooling flow passage, the second channel is at least in part arranged along the trailing edge and is in a fluid communication with the cooling bores for discharging cooling air from the second channel of the cooling flow passage. A deflector is arranged at the end of the first integral rib and configured for dividing flow of the cooling air stream received through the cooling air inlet into a first cooling air stream and a second cooling air stream and for directing the first cooling air stream into the first channel and for directing the second cooling air stream into the second channel, respectively. The cooling air stream is received through the cooling air inlet is a cooling air jet stream, wherein the first cooling air stream and the second cooling air stream divided by the deflector are a first cooling air jet stream and the second cooling air jet stream, respectively. The deflector is configured to deflect the first cooling air jet stream obliquely to the suction sidewall in the first channel of the cooling flow passage of the nozzle segment, and the first channel is configured to transport the first cooling air jet stream along said first channel in a swirly flow.

In another aspect, the disclosure relates to a nozzle for a gas turbine engine comprising at least one nozzle segment. The nozzle segment comprises an outer band comprising a cooling air inlet, an inner band comprising a first cooling air outlet, and at least one nozzle airfoil comprising a pressure sidewall, a suction sidewall, a leading edge and a trailing edge. The pressure sidewall and the suction sidewall are spaced apart and extend in span between the outer band and the inner band and in chord between a leading edge and a trailing edge, the nozzle airfoil comprises a cooling bores arranged within the trailing edge. The nozzle further comprises a cooling flow passage arranged at least within the nozzle airfoil for cooling said nozzle airfoil with cooling air, wherein the cooling flow passage is in a fluid communication with the cooling air inlet for delivering cooling air into the cooling flow passage as a cooling air stream, and a first integral rib protruding from the inner band and arranged spaced apart from the leading edge for defining a first channel and a second channel within the cooling flow passage. The first channel is arranged along the leading edge and is in a fluid communication with the first cooling air outlet for discharging cooling air from the first channel of the cooling flow passage, the second channel is at least in part arranged along the trailing edge and is in a fluid communication with the cooling bores for discharging cooling air from the second channel of the cooling flow passage. A deflector is arranged at the end of the first integral rib and configured for dividing flow of the cooling air stream received through the cooling air inlet into a first cooling air stream and a second cooling air stream and for directing the first cooling air stream into the first channel and for directing the second cooling air stream into the second channel, respectively. The cooling air stream is received through the cooling air inlet is a cooling air jet stream, wherein the first cooling air stream and the second cooling air stream divided by the deflector are a first cooling air jet stream and the second cooling air jet stream, respectively. The deflector is configured to deflect the first cooling air jet stream obliquely to the suction sidewall in the first channel of the cooling flow passage of the nozzle segment, and the first channel is configured to transport the first cooling air jet stream along said first channel in a swirly flow.

In yet another aspect, the disclosure relates to a gas turbine engine comprising a nozzle having at least one nozzle segment. The nozzle segment comprises an outer band comprising a cooling air inlet, an inner band comprising a first cooling air outlet, and at least one nozzle airfoil comprising a pressure sidewall, a suction sidewall, a leading edge and a trailing edge. The pressure sidewall and the suction sidewall are spaced apart and extend in span between the outer band and the inner band and in chord between a leading edge and a trailing edge, the nozzle airfoil comprises a cooling bores arranged within the trailing edge. The nozzle further comprises a cooling flow passage arranged at least within the nozzle airfoil for cooling said nozzle airfoil with cooling air, wherein the cooling flow passage is in a fluid communication with the cooling air inlet for delivering cooling air into the cooling flow passage as a cooling air stream, and a first integral rib protruding from the inner band and arranged spaced apart from the leading edge for defining a first channel and a second channel within the cooling flow passage. The first channel is arranged along the leading edge and is in a fluid communication with the first cooling air outlet for discharging cooling air from the first channel of the cooling flow passage, the second channel is at least in part arranged along the trailing edge and is in a fluid communication with the cooling bores for discharging cooling air from the second channel of the cooling flow passage. A deflector is arranged at the end of the first integral rib and configured for dividing flow of the cooling air stream received through the cooling air inlet into a first cooling air stream and a second cooling air stream and for directing the first cooling air stream into the first channel and for directing the second cooling air stream into the second channel, respectively. The cooling air stream is received through the cooling air inlet is a cooling air jet stream, wherein the first cooling air stream and the second cooling air stream divided by the deflector are a first cooling air jet stream and the second cooling air jet stream, respectively. The deflector is configured to deflect the first cooling air jet stream obliquely to the suction sidewall in the first channel of the cooling flow passage of the nozzle segment, and the first channel is configured to transport the first cooling air jet stream along said first channel in a swirly flow.

BRIEF DESCRIPTION OF FIGURES

A full and enabling disclosure of the present description, including the best mode thereof, directed to one of ordinary skill in the art, is set forth in the specification, which refers to the appended FIGS., in which.

DETAILED DESCRIPTION

Figure 1:
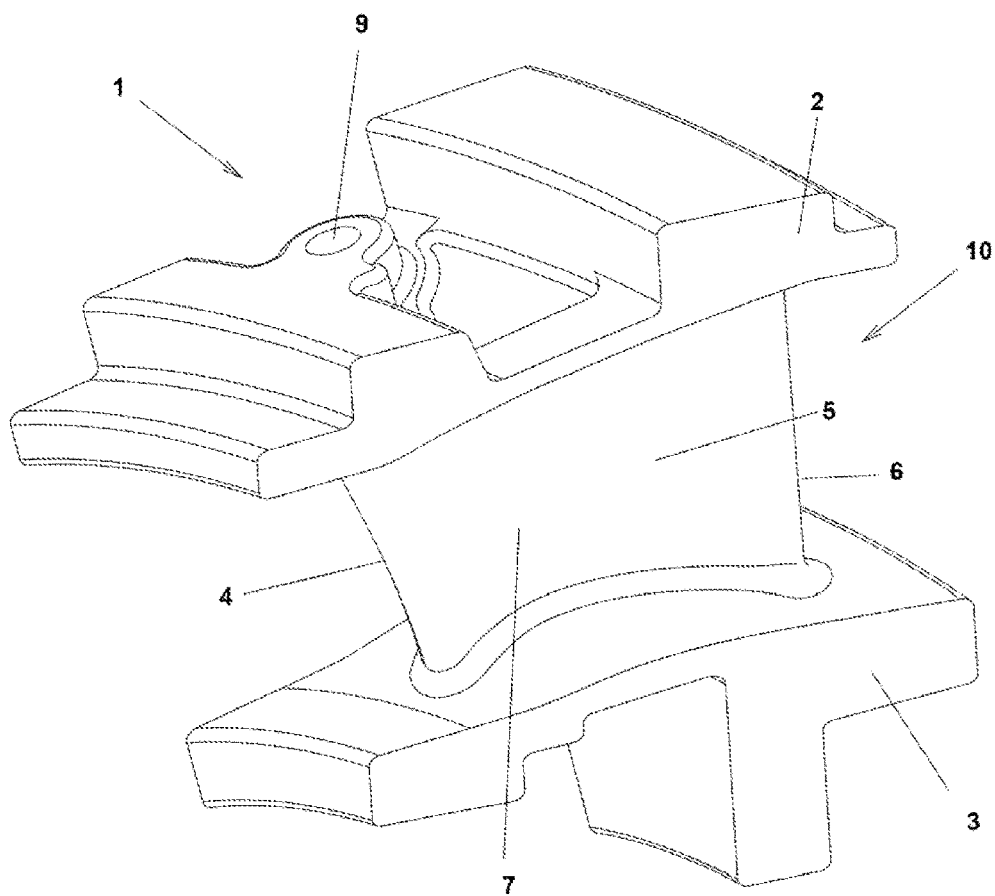
FIG. 1 shows a perspective view of the turbine nozzle segment according to aspects described herein.
Figure 5:
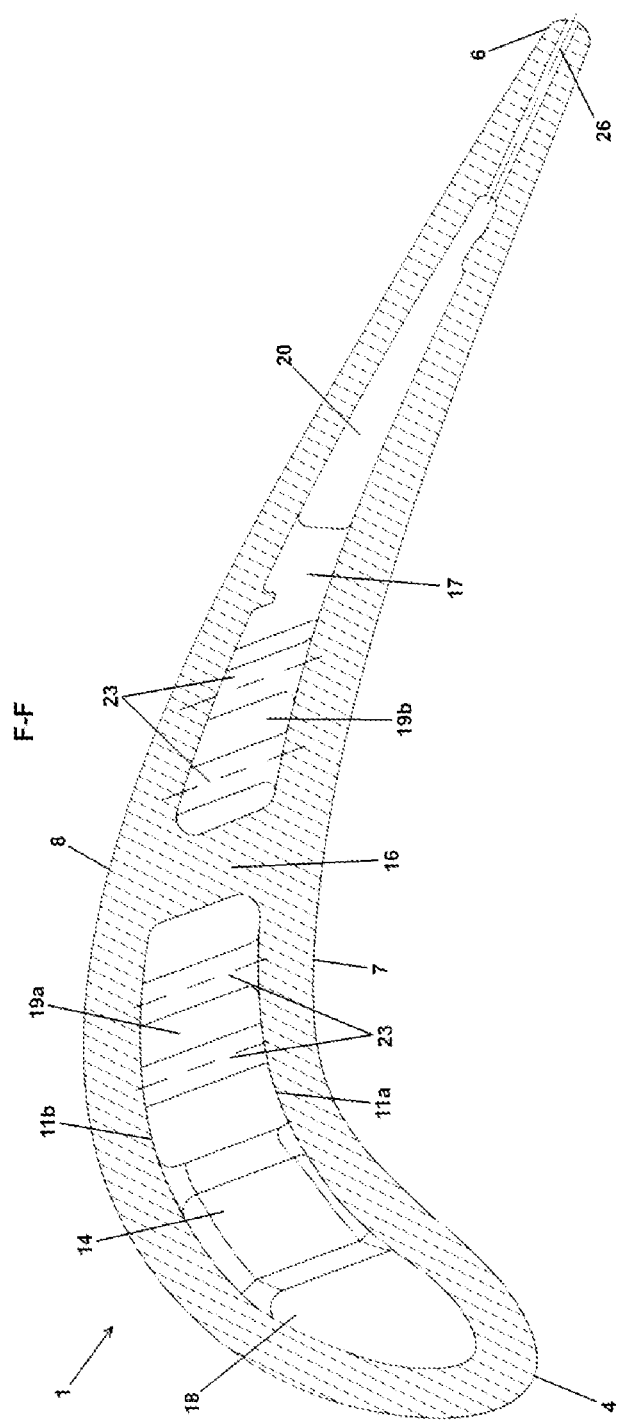
FIG. 5 shows a cross-section view of the turbine nozzle segment according to the to aspects described herein, taken along the line F-F in FIG. 3.
Figure 7:
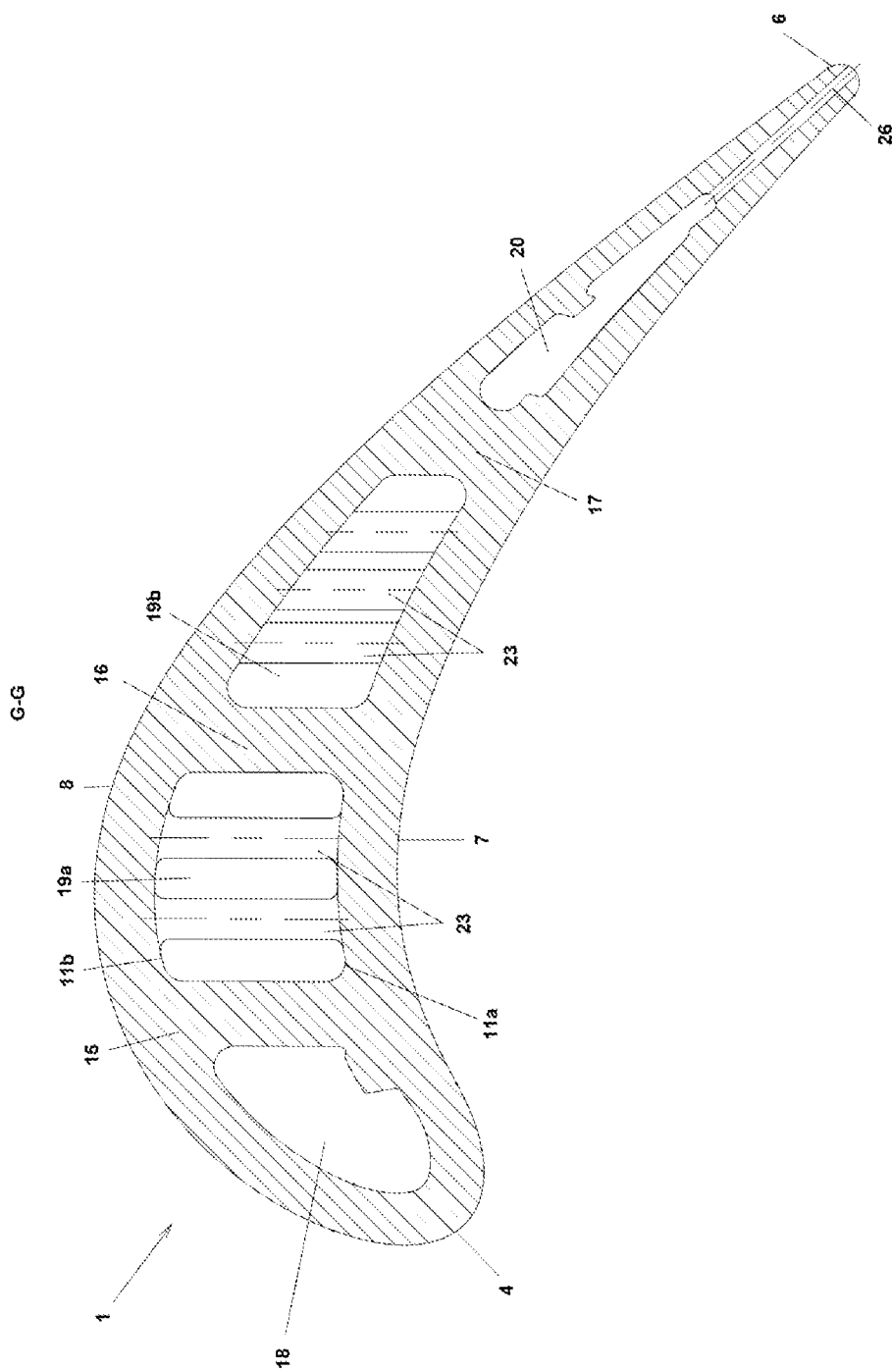
FIG. 7 shows a cross-section view of the turbine nozzle segment according to aspects described herein, taken along the line G-G in FIG. 3.

Referring now to the figures, FIG. 1 shows a second stage nozzle segment 1 for a HPT for a gas turbine engine. The nozzle segment 1 comprises an outer band 2, an inner band 3 and at least one nozzle airfoil 10, extending between the outer band 2 and inner band 3, as shown in FIG. 1. The outer band 2 and the inner band 3 form an upper part and a lower part 5 of the nozzle segment 1, respectively. The outer band 2 and the inner band 3 define a flow path for transporting combustion gases from a combustor of a gas turbine engine downstream. The nozzle airfoils 10 of the HPT are arranged within said flow path of the combustion gases. The nozzle airfoil 10 comprises a pressure sidewall 7 and a suction sidewall 8 extending in span between the inner band 3 and the outer band 2 of the nozzle segment 1, as shown in FIG. 1. The pressure sidewall 7 and the suction sidewall 8 extend also in chord and are joined together at one side forming a leading edge 4 and at the opposite side forming a trailing edge 6 of the nozzle airfoil 10, as shown in FIGS. 1, 5 and 7. The nozzle airfoil 10 comprises mid-chord areas 5 extending between the leading edge 4 and the trailing edge 6 on both sides of said nozzle airfoil 10, respectively. The nozzle airfoil 10 is the main working part of the nozzle segment 1. The nozzle airfoils 10 of a HPT provide the required angular component of momentum of combustion gases flowing through the nozzles, in order to produce useful torque on rotor blades being arranged downstream to the nozzles.

Figure 2:
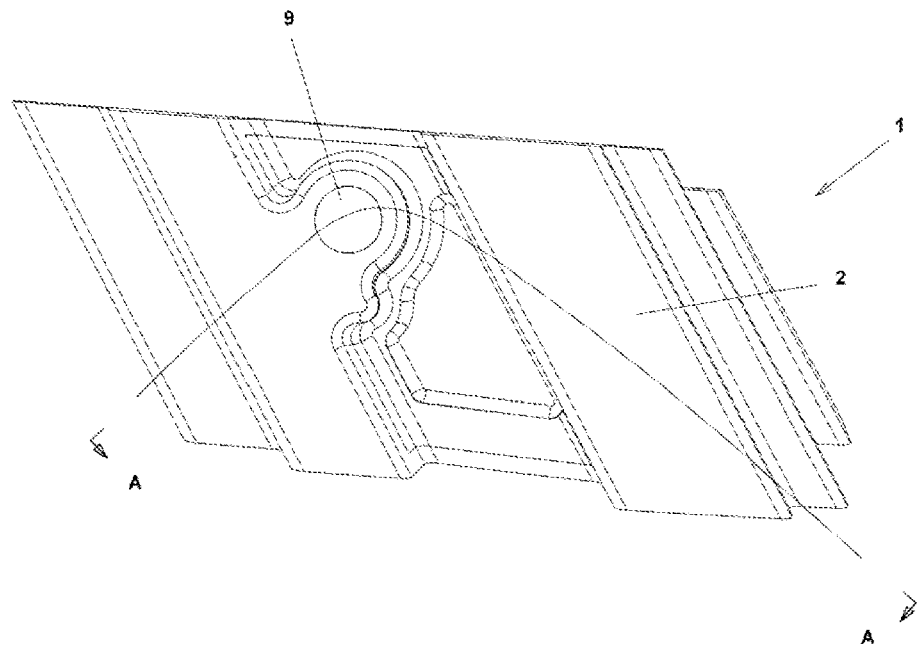
FIG. 2 shows a top view of the turbine nozzle segment of FIG. 1.
Figure 3:
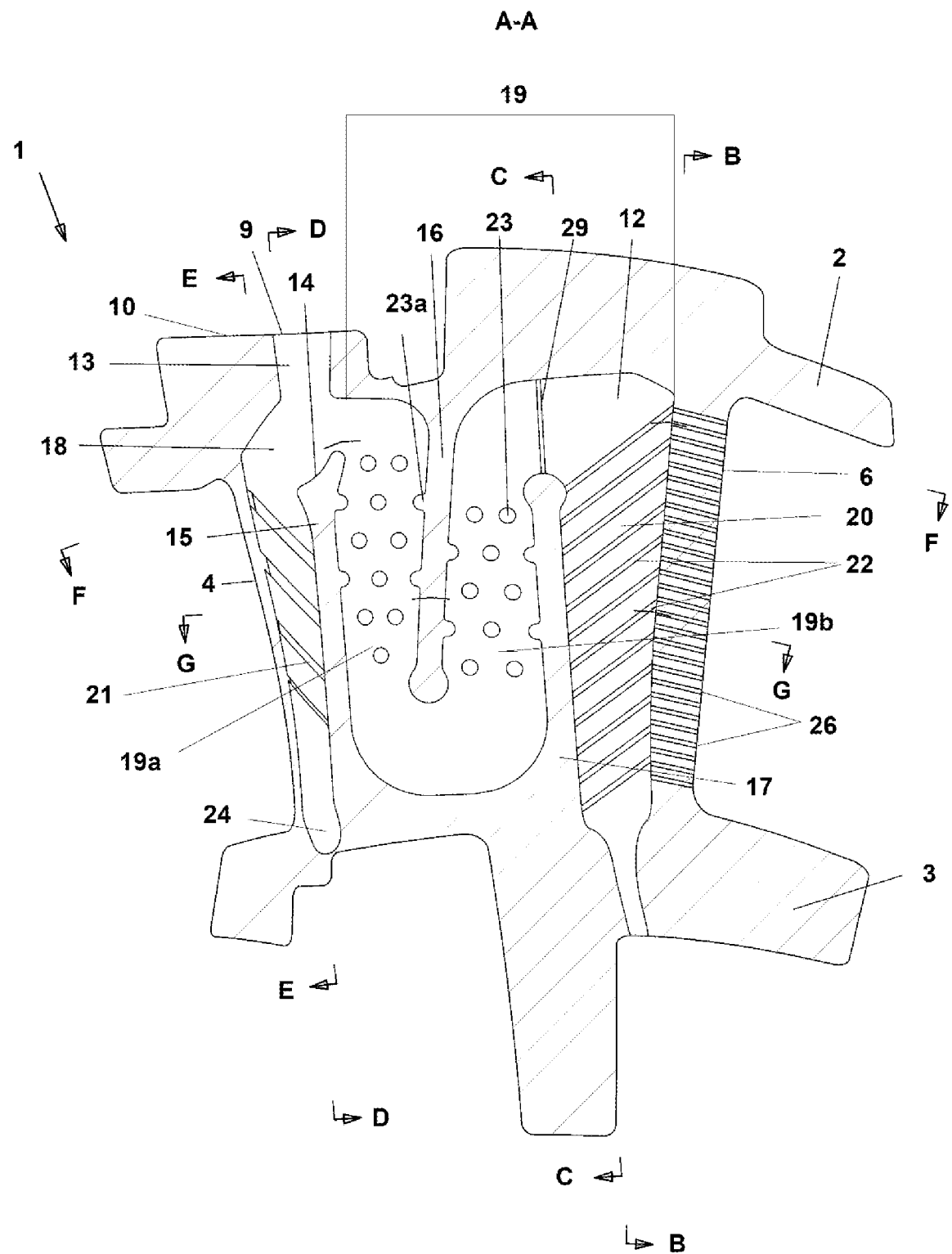
FIG. 3 shows a cross-section view of the turbine nozzle segment according to aspects described herein, taken along the line A-A in FIG. 2.

The nozzle segment 1 comprises an internal cooling system for cooling said nozzle segment 1. The internal cooling system comprises a cooling flow passage 12 for transporting cooling air through the nozzle segment 1. The cooling flow passage 12 is comprised within the outer band 2, the nozzle airfoil 10 and the inner band 3, as shown in FIG. 3. The internal cooling system comprises further a cooling air inlet 9 for feeding cooling air into said system. The cooling air inlet 9 is in a fluid communication with the cooling flow passage 12 to feed cooling air into said passage 12, as shown in FIGS. 2, 3 and 12 to 14. The cooling air inlet 9 is configured to feed cooling air into the cooling flow passage 12 as a cooling air jet stream 13. The cooling air inlet 9 is configured to feed cooling air into the cooling flow passage 12 at a velocity equal or over about 0.1 Mach, preferably at a velocity in a range of about 0.2 to about 0.3 Mach. The cooling air inlet 9 is arranged in the outer band 2, as shown in FIGS. 1 and 2. The cooling air inlet 9 has a shape suitable to feed cooling air into the cooling flow passage 12 in a form of the cooling air jet stream 13. In one aspect the cooling air inlet 9 has cylindrical shape. In another aspect, the cooling air inlet 9 has conical shape, as shown in FIG. 3. The cooling air inlet 9 comprises the main axis O extending through said inlet 9. The cooling air inlet 9 is configured to feed cooling air into the cooling flow passage 12 along said main axis O of said inlet 9.

Figure 8:
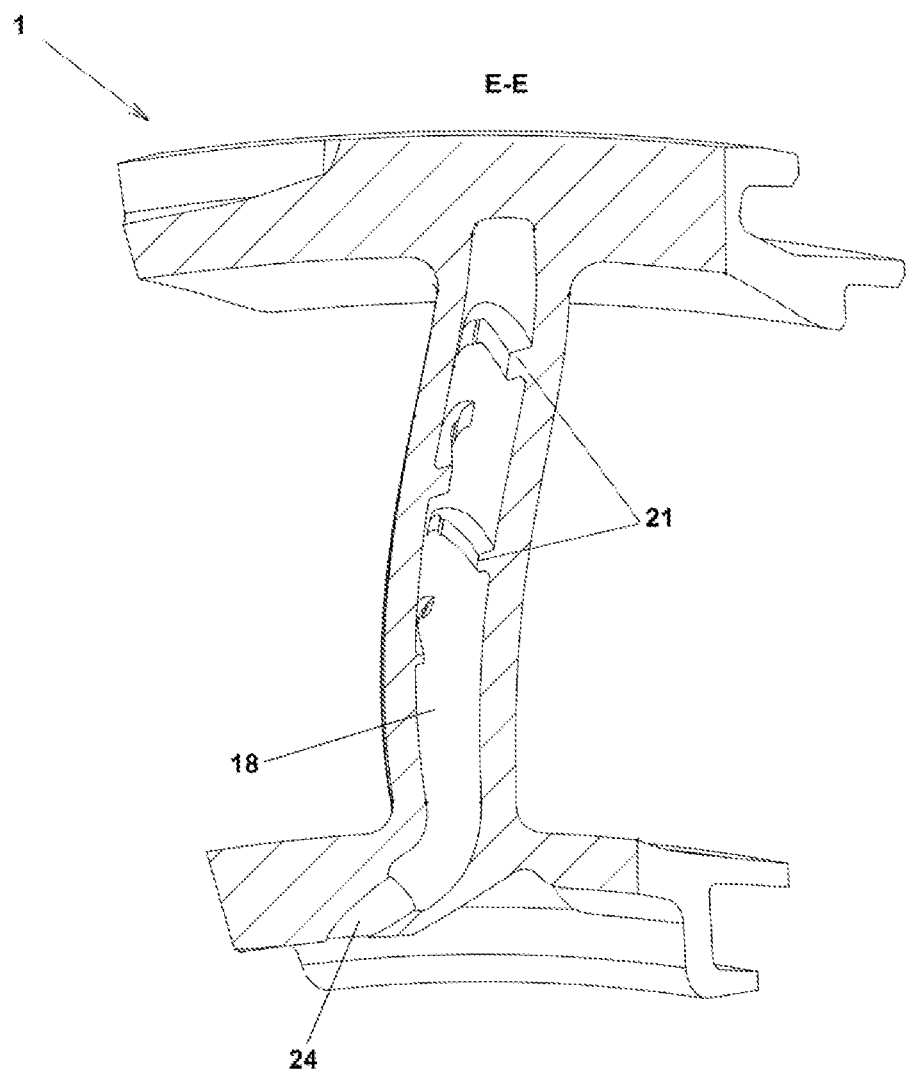
FIG. 8 shows a cross-section view of the first channel of the turbine nozzle segment according to aspects described herein, taken along the line E-E in FIG. 3.
Figure 9:
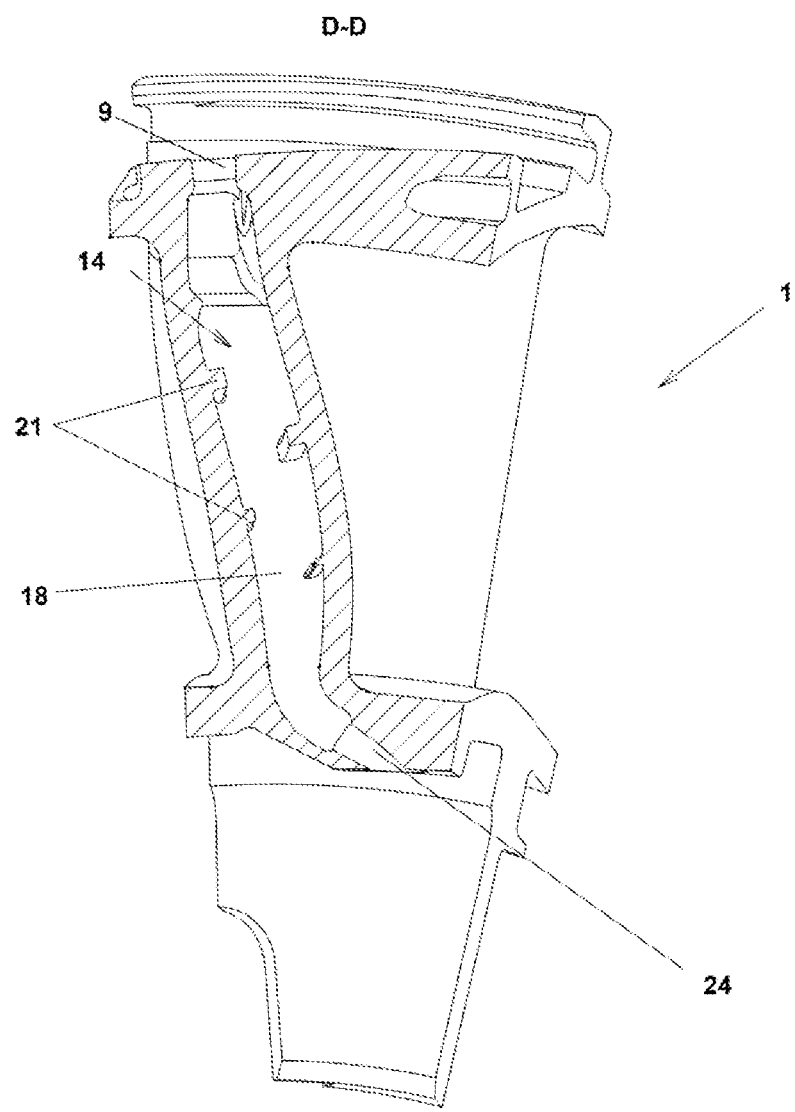
FIG. 9 shows a cross-section view of the first channel the turbine nozzle segment according to aspects described herein, taken along the line D-D in FIG. 3.
Figure 12:
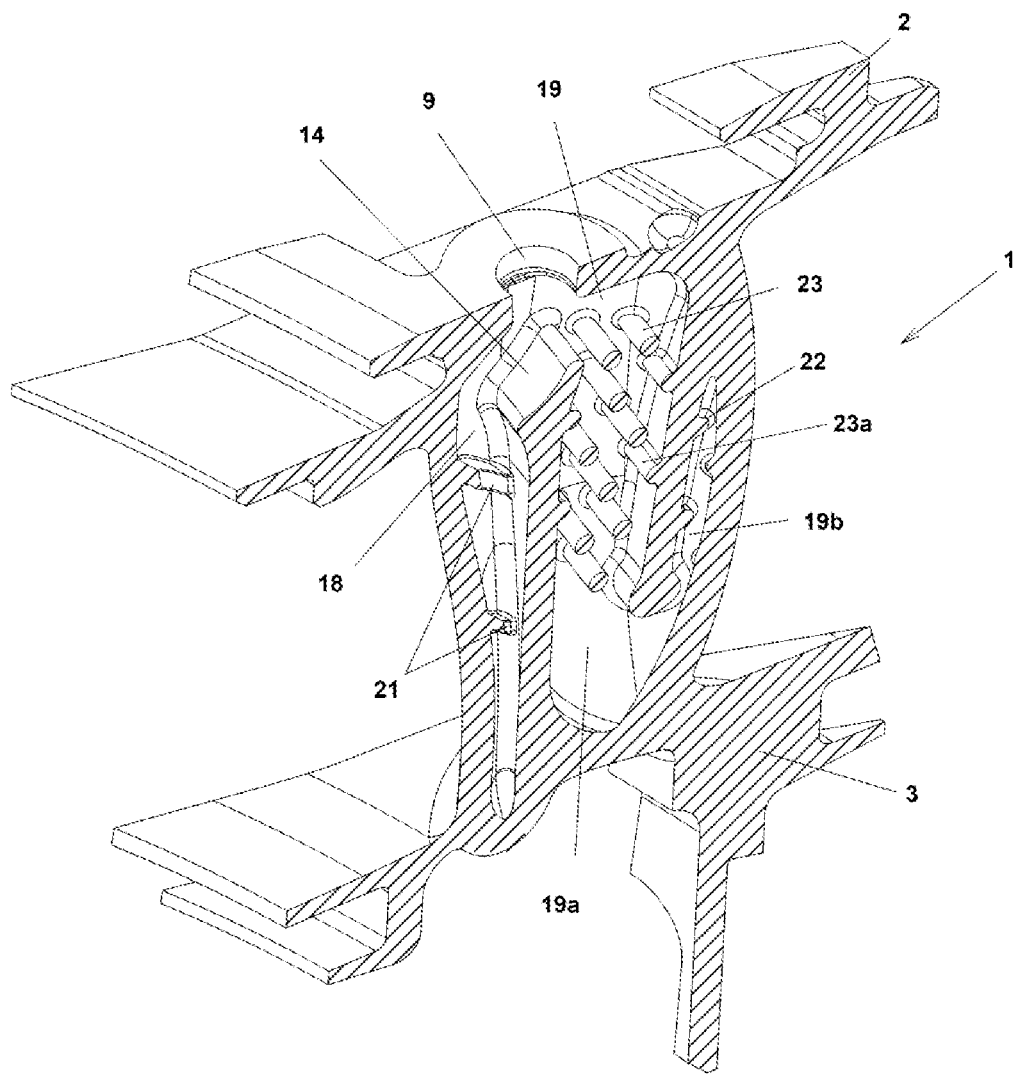
FIG. 12 shows a perspective cross-section view of the turbine nozzle segment according to aspects described herein, taken along the inlet.

The nozzle segment 1 comprises a first integral rib 15 protruding from the inner band 3 and extending inside the nozzle airfoil 10 towards the outer band 2, as shown in FIGS. 3 and 12. The first integral rib 15 defines within the cooling flow passage 12 a first channel 18. In other words, the first channel 18 is defined between the first integral rib 15, the pressure sidewall 7, the suction sidewall 8 and the leading edge 4, and extends along said leading edge 4 towards the inner band 3, as shown in FIGS. 3, 8 and 12. The first channel 18 is in a fluid communication with the cooling air inlet 9 for feeding cooling air into said first channel 18. The internal cooling system comprises further a first cooling air outlet 24. The first cooling air outlet 24 is arranged in the inner band 3 of the nozzle segment 1 in proximity to the leading edge 4, as shown in FIG. 3. The first cooling air outlet 24 is in a fluid communication with the first channel 18 for discharging cooling air out of said first channel 18 of the cooling flow passage 12 and, therefore, out of the cooling flow passage 12 of the internal cooling system. The first channel 18 channels a first cooling air jet stream of the cooling air jet stream 13 for cooling the leading edge 4, as well as the pressure sidewall 7 and the suction sidewall 8 in a vicinity of said leading edge 4 of the nozzle airfoil 10.

Figure 11:
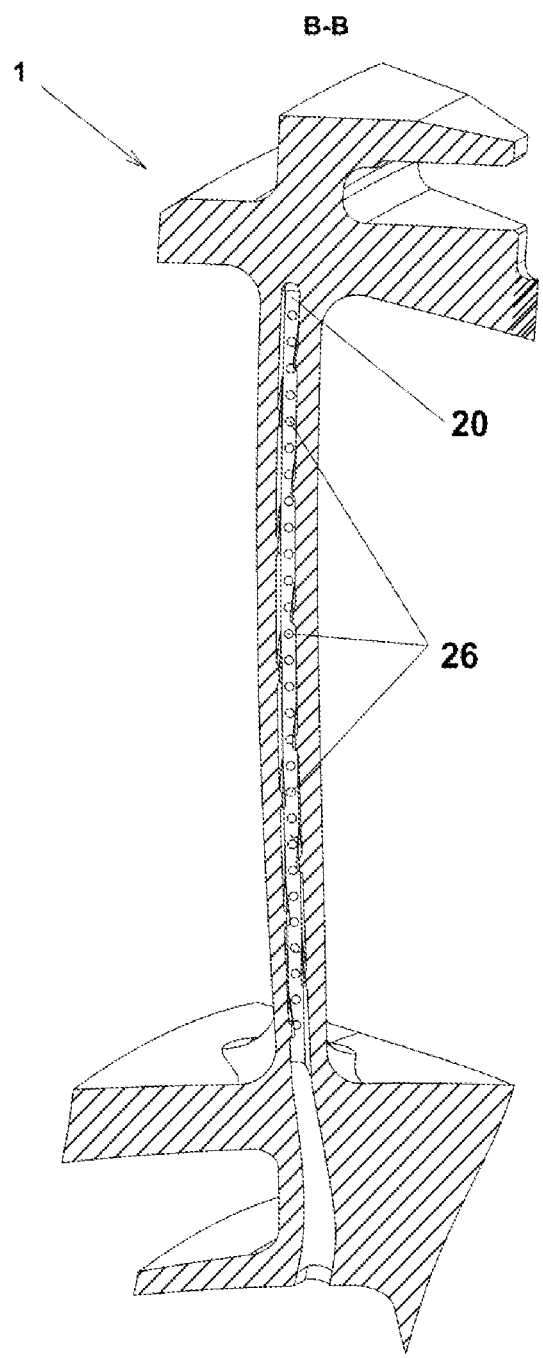
FIG. 11 shows a cross-section view of the third cavity of the second channel of the turbine nozzle segment according to aspects described herein, taken along the line B-B in FIG. 3.

The first integral rib 15 defines also within the cooling flow passage 12 a second channel 19. In other words, the second channel 19 is defined between the first integral rib 15, the pressure sidewall 7, the suction sidewall 8 and the trailing edge 6. The second channel 19 is in a fluid communication with the cooling air inlet 9 for feeding cooling air into said second channel 19. The second channel 19 channels a second cooling air jet stream of the cooling air jet stream 13 for cooling the remaining part of the nozzle airfoil 10. The nozzle segment 1 comprises a second integral rib 16 arranged next to the first integral rib 15 in the direction to the trailing edge 6. The second integral rib 16 protrudes from the outer band 2 and extends inside the nozzle airfoil 10 towards the inner band 3, as shown in FIGS. 3 and 12. The second integral rib 16 defines within the second channel 19 of the cooling flow passage 12 a first cavity 19*a*. In other words, the first cavity 19*a* of the second channel 19 is defined between the first integral rib 15, the pressure sidewall 7, the suction sidewall 8 and the second integral rib 16, and extends along said first and second ribs 15, 16 towards the inner band 3, as shown in FIGS. 3, 8 and 12. The first cavity 19*a* is in a fluid communication with the cooling air inlet 9 at the outer band 2 for feeding cooling air into said first cavity 19*a* of the second channel 19. The first cavity 19*a* of the second channel 19 channels the second cooling air jet stream of the cooling air jet stream 13 for cooling the mid-chord areas of the nozzle airfoil 10 located farther to the leading edge 4. The nozzle segment 1 comprises a third integral rib 17 arranged next to the second integral rib 16 in the direction to the trailing edge 6. Similarly to the first integral rib 15, the third integral rib 17 protrudes from the inner band 3 and extends inside the nozzle airfoil 10 towards the outer band 2, as shown in FIGS. 3 and 12. The third integral rib 17 defines within the second channel 19 of the cooling flow passage 12 a second cavity 19*b*. In other words, the second cavity 19*b* of the second channel 19 is defined between the second integral rib 16, the pressure sidewall 7, the suction sidewall 8 and the third integral rib 17, and extends along said second and third ribs 16, 17 towards the outer band 2, as shown in FIGS. 3, 8 and 12. The second cavity 19*b* is in a fluid communication with the first cavity 19*a* at the inner band 3 for transferring further cooling air into said second cavity 19*b* of the second channel 19. The second cavity 19*b* of the second channel 19 channels the second cooling air jet stream of the cooling air jet stream 13 for cooling the mid-chord areas 5 of the nozzle airfoil 10 located substantially in the middle of the nozzle airfoil 10. The third integral rib 17 defines also inside the second channel 19 of the cooling flow passage 12 a third cavity 20. In other words, the third cavity of the second channel 19 is defined between the third integral rib 17, the pressure sidewall 7, the suction sidewall 8 and the trailing edge 6, and extends along said trailing edge 6 towards the inner band 3, as shown in FIGS. 3, 8 and 12. The third cavity 20 is in a fluid communication with the second cavity 19*b* at the outer band 2 for transferring further cooling air into said third cavity 20 of the second channel 19. The third cavity 20 of the second channel 19 channels the second cooling air jet stream of the cooling air jet stream 13 for cooling the mid-chord areas 5 of the nozzle airfoil 10 located close to the trailing edge and said trailing edge 6 as such. The internal cooling system of the nozzle segment 1 comprises further cooling bores 26. The cooling bores 26 are in a fluid communication with the second channel 19 for discharging cooling air out of said second channel 19 of the cooling flow passage 12 and, therefore, out of the internal cooling system. More specifically, the cooling bores 26 are in a fluid communication with the third cavity 20 of the second channel 19. The cooling bores 26 are provided for cooling the trailing edge 6 with cooling air from the second air flow discharged through said cooling bores 26. The cooling bores 26 are arranged along the trailing edge 6. In an aspect the cooling bores 26 are arranged one next another in a row along the trailing edge 6, as shown in FIGS. 3 and 11. Such an arrangement of the cooling bores 26 provides uniform discharging of cooling air through the trailing edge 6 enhancing thereby uniform cooling of said trailing edge 6. In another aspect, the second air flow is discharged through slots (not shown). The slots, are arranged in the same way, as described above for the cooling bores 26. The slots are used to discharge more amount of cooling air for enhanced cooling the trailing edge 6 of the nozzle airfoil 10, if necessary.

Figure 13:
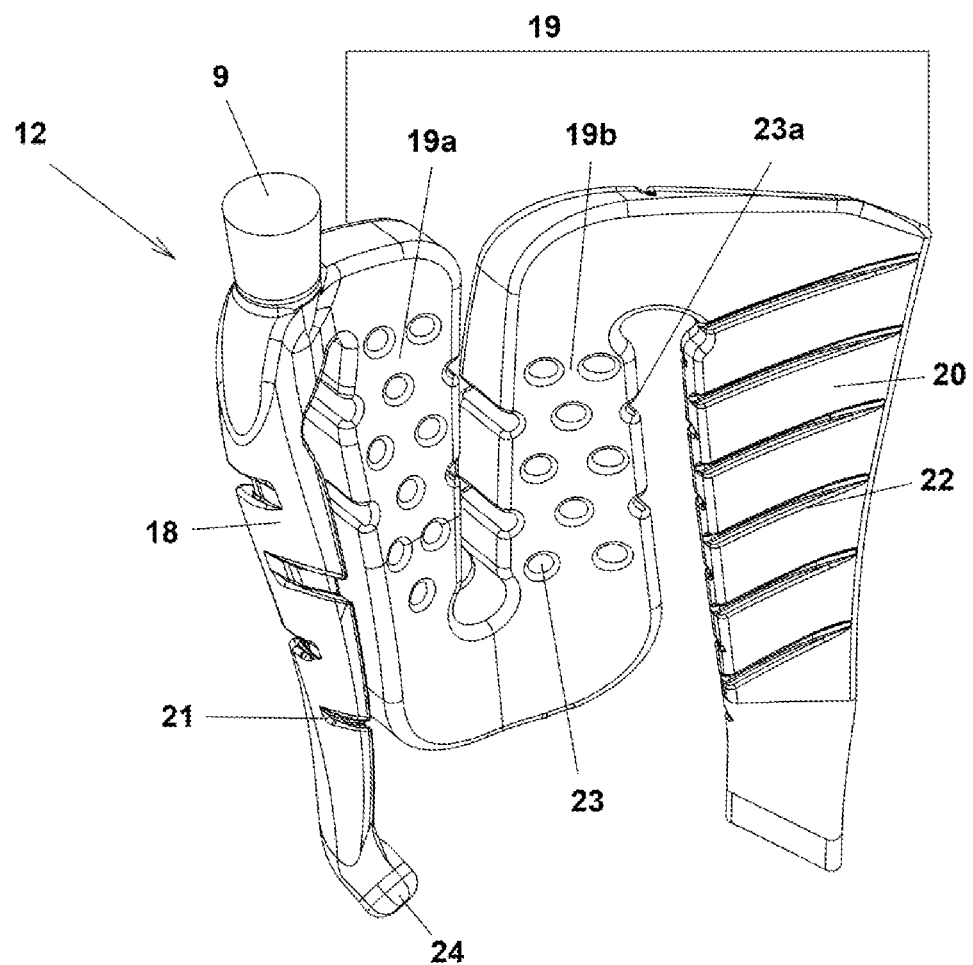
FIG. 13 shows a perspective view of the core of the turbine nozzle segment according to aspects described herein presenting a serpentine cooling path front wall facing a pressure sidewall.
Figure 14:
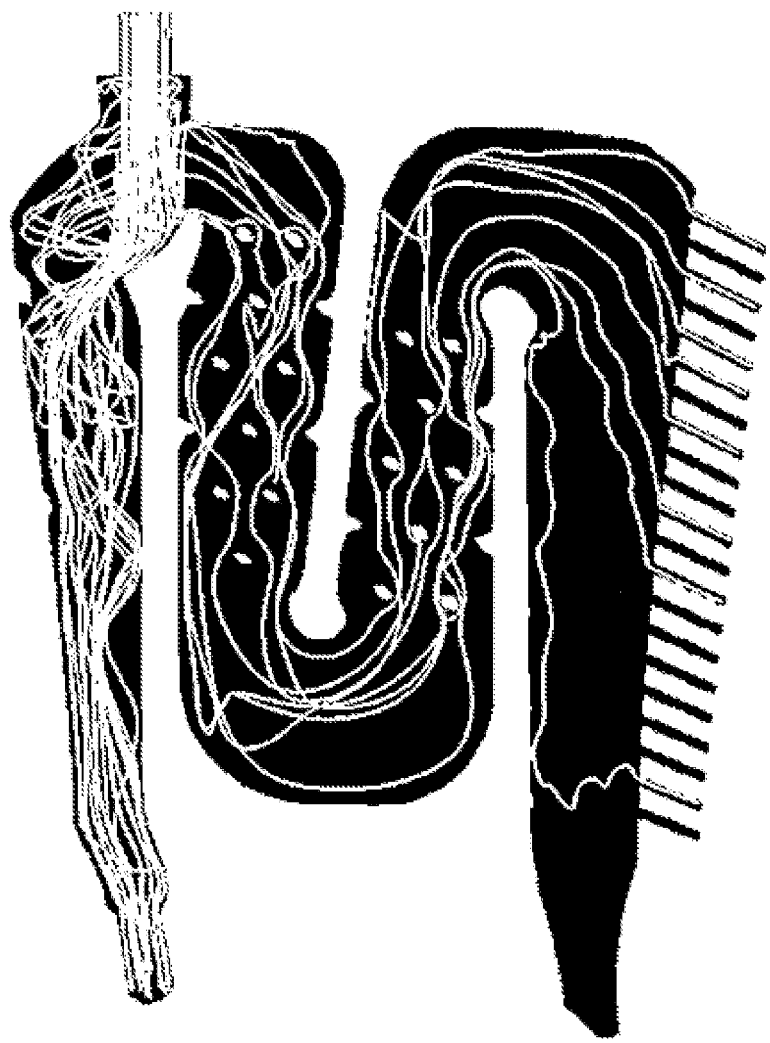
FIG. 14 shows a side view of the core of the turbine nozzle segment according to aspects described herein presenting visualization of the first and the second cooling air jet streamlines.

The second channel 19 of the cooling flow passage 12, as described above, comprising the first cavity 19*a*, the second cavity 19*b* and the third cavity 20, is arranged in a meandered form, as shown in FIGS. 3, 13 and 14. Said meander form of the second channel 19 provides a long path for a flow of cooling air for efficient cooling the mid-chord areas 5 and the trailing edge 6 of the nozzle airfoil 10.

Figure 6:
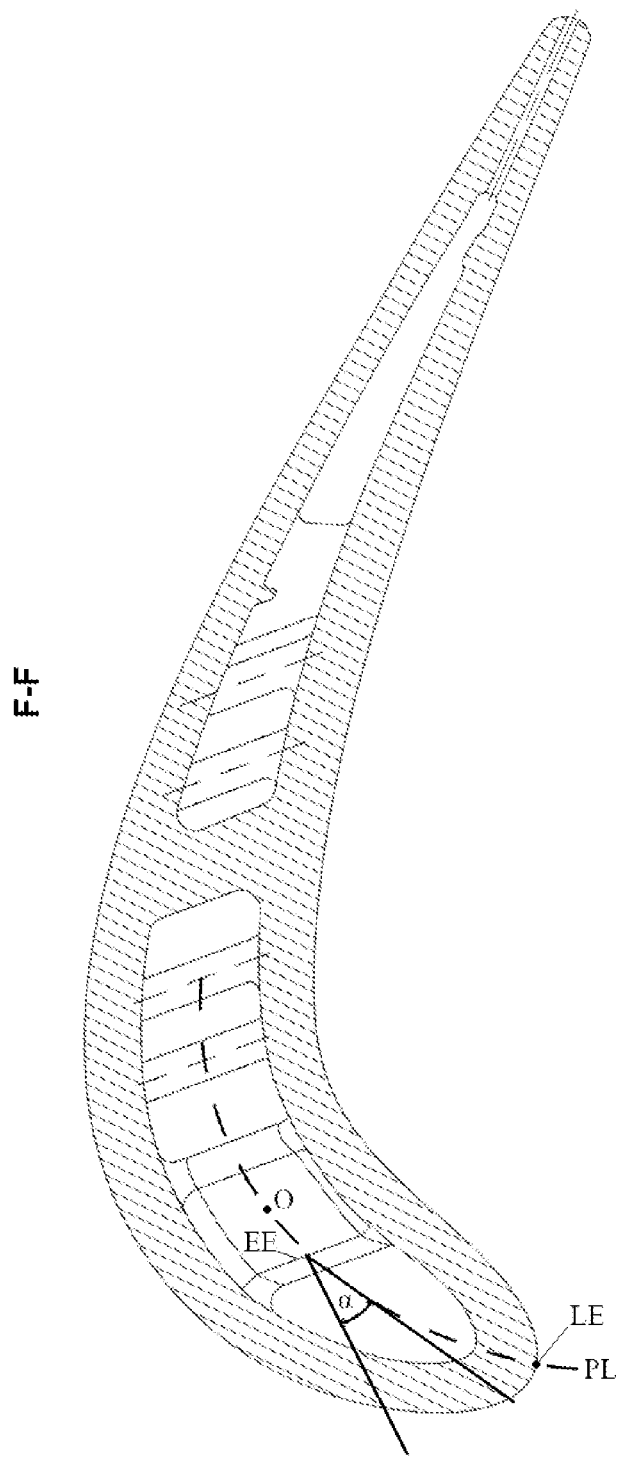
FIG. 6 shows a cross-section view of the turbine nozzle segment from FIG. 5, illustrating the definition of the deflection angle α (reference numbers of the components omitted for clarity).

The nozzle airfoil 10 comprises a deflector 14 for dividing the cooling air jet stream 13 into the first cooling air jet stream and the second cooling air jet stream and for directing said first and second cooling air jet streams into the first channel 18 and the second channel 19 of the cooling flow passage 12, respectively. The deflector 14 is arranged on a distal end of the first integral rib 15, as shown in FIGS. 3 and 12. The deflector 14 preferably extends in span between the pressure sidewall 7 and the suction sidewall 8, as shown in FIG. 5. The deflector 14 is arranged in proximity of the cooling air inlet 9. In particular, the deflector 14 is positioned substantially in front of and at a distance from the cooling air inlet 9, as shown in FIGS. 3 and 12. In other words, the deflector 14 is configured to face towards the cooling air jet stream 13 entering the cooling flow passage 12 through the cooling air inlet 9. The deflector 14 comprises a surface inclined downwards the inner band 3, as shown in FIG. 3. The surface of the deflector 14 is also faced towards the suction sidewall 8 and the leading edge 4, as shown in FIGS. 3, 5 and 6. In one aspect, the surface of the deflector 14 is concave, as shown in FIGS. 3 and 12. In another aspect the surface of the deflector 14 is flat. In yet another aspect, the surface of the deflector 14 is convex. The surface of the deflector 14 can also have a complex geometry, composed of sub-surfaces of the above mentioned geometries. In yet another aspect the surface of the deflector 14 comprises several inclined sub-surfaces. The surface of the deflector 14 provides to said deflector 14 a function of deflecting of the first cooling air jet stream of the cooling air jet stream 13.

Figure 4:
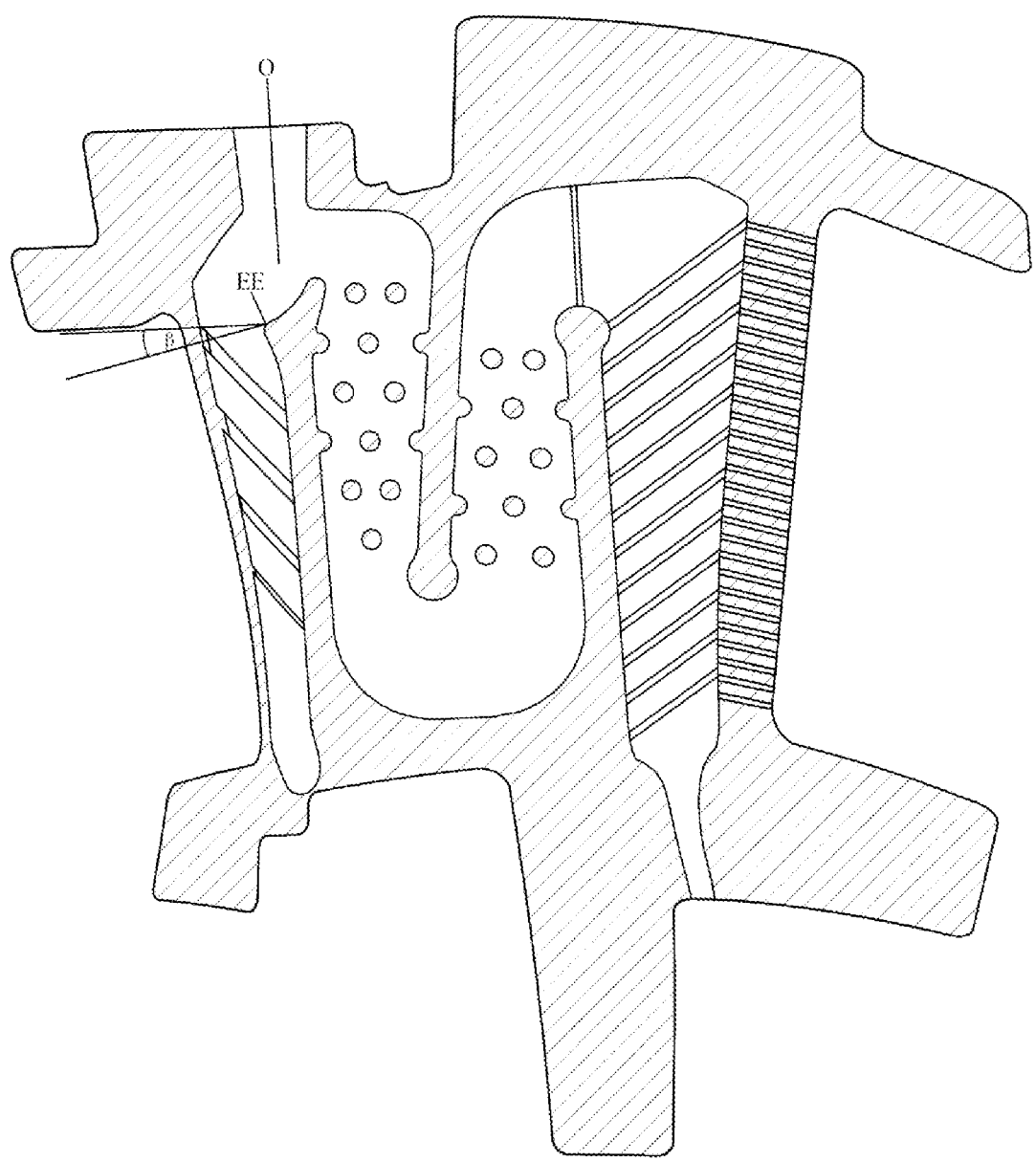
FIG. 4 shows a cross-section view of the turbine nozzle segment from FIG. 3, illustrating the definition of the deflection angle β (reference numbers of the 5 components omitted for clarity).

The deflector 14 deflects the first cooling air jet stream to hit the leading edge 4 and impinge the suction sidewall 8 of the nozzle airfoil 10. The first cooling air jet stream is deflected on the deflector 14 askew with respect to the direction of flow of the cooling air jet stream 13 entering the nozzle airfoil 10 through the cooling air inlet 9. Avoiding to be bound by any theory, the geometry of the deflection of the first cooling air jet stream is also discussed conventionally below in two dimensions, i.e., in a lateral direction and in a longitudinal direction of the nozzle airfoil 10. The lateral direction is understood in the context of the present disclosure as a general direction defined between the leading edge 4 and the trailing edge 6 of the nozzle airfoil 10 of the turbine nozzle segment 1. The lateral direction of the nozzle airfoil 10 may also be understood as a normal to a radial direction of the turbine, comprising such a nozzle airfoil 10. The longitudinal direction is understood in the context of the present disclosure as a general direction defined between the outer band 2 and the inner band 3 of the turbine nozzle segment 1. The longitudinal direction of the nozzle airfoil 10 may also be understood as a radial direction of the turbine, comprising such a nozzle airfoil 10. Considering the lateral direction of the deflection, the first cooling air jet stream is deflected on the deflector 14 towards the leading edge 4 and the suction sidewall 8 in the vicinity of said leading edge 4 at an angle α, as shown in FIG. 6. The angle α of the lateral component of the deflection of the first cooling air jet stream is in a range from about 5° to about 60°, preferably in a range from about 15° to about 40°, and more preferably is about 30°. The angle α is defined between the tangent to a parting line PL and the line representing the intended direction of flow of the first cooling air jet stream, the starting point of the tangent being defined at most forward edge EE of the surface of the deflector 14, as defined in the lateral cross section of the nozzle airfoil 10 and shown in detail in FIG. 6. The parting line PL is a geometric line extending within the interior of the nozzle airfoil 10 in the equal distance from both the pressure sidewall 7 and the suction sidewall 8, as shown in FIG. 6. An intersection of the parting line PL with the wall of the nozzle airfoil 10 around of the leading edge 4 defines geometrically an intersection point LE. A Specialist in the field is aware how to determine the parting line PL and the related intersection point LE in the nozzle airfoil 10. Considering the longitudinal direction of the deflection, the first cooling air jet stream is also deflected on the deflector 14 towards the leading edge 4 and the suction sidewall 8 in the vicinity of said leading edge 4 at an angle β, as shown in FIG. 4. The angle β of the longitudinal component of the deflection of the first cooling air jet stream is in a range from about 5° to 60°, preferably in a range from about 10° to 50°, more preferably is about 30°. The angle β is defined between the line perpendicular to the main axis O of the cooling air inlet 9 and the line representing the direction of flow of the first cooling air jet stream, the starting point of the perpendicular line being defined at most forward edge EE of the surface of the deflector 14, as defined in the longitudinal cross section of the nozzle airfoil 10 and shown in detail in FIG. 4. In a consequence the first cooling air jet stream is directed to the leading edge 4 and the suction sidewall 8 in the vicinity of said leading edge 4 at least at the same level as the deflector 14. In an aspect the first cooling air jet stream is deflected below the deflector 14, as shown in FIG. 14. The deflector 14 deflects the first cooling air jet stream so that said first cooling air jet stream hits around the area of the turbine nozzle segment 1, wherein the outer band 2 is joined with the nozzle airfoil 10. The area of hitting of the first cooling air jet stream, as discussed above, provides efficient flow of the first cooling air jet stream downstream of the first channel 18 of the cooling flow passage 12. In an aspect, the deflector 14 deflects the first cooling air jet stream so that said first cooling air jet stream hits the area of the turbine nozzle segment 1 just below, wherein the outer band 2 is joined with the nozzle airfoil 10, as shown in FIG. 14.

The nozzle airfoil 10 comprises turbulators 21 arranged within the first channel 18 of the cooling flow passage 12. The turbulators are provided for stripping of a boundary layer along inner walls of said first channel 18 and for accelerating and swirling cooling air of the first cooling jet stream within said first channel 18, increasing thereby further cooling efficiency of the nozzle airfoil 10. The number and the orientation of the turbulators 21 are selected according to the needs. One parameter taken into consideration when determining the number of turbulators 21 in the first channel 18 is a spacing S. The spacing S is defined as p/e, wherein p is a distance between two adjacent turbulators 21 and e is a height of said turbulators 21. As a general rule, the number of turbulators 21 is increased with the spacing S is decreased. Other parameter taken into consideration when determining the number of turbulators 21 in the first channel 18 is a blockage B. The blockage B is defined as e/Dh, wherein e is a height of the turbulators 21 and Dh is a hydraulic diameter of the first channel 18 for turbulating. And again, as a general rule, if the blockage B is increased the efficiency of cooling increases and the pressure drop of cooling air in the first channel 18 is increased. For the first channel 18 of the turbine nozzle segment 1 according to non-limiting aspects, the spacing S is in a range from about 4% to about 14%, preferably from about 6% to about 12%, whereas the blockage B is in a range from about 20% to about 40%, preferably is about 30%. The number of the turbulators 21 for the first channel 18 of the nozzle airfoil 10 according to a non-limiting aspect is in the range from 2 to 6. In an aspect the first channel 18 comprises four turbulators 21, as shown in FIGS. 3, 8 and 13. The turbulators 21 are arranged in the first channel 18 in an inclined pattern, as shown in FIGS. 3, 8 and 13. The turbulators 21 are inclined to the first integral rib 15 at an angle in a range from about 40° to about 90°. In one aspect the turbulators 21 are inclined at an angle about 45°, as shown in FIG. 3. In another aspect, the turbulators 21 are inclined at an angle about 60°. In yet another aspect, the turbulators 21 are inclined at an angle about 90°. The turbulators 21 are arranged in the first channel 18 in a staggered pattern, as shown in a FIGS. 8 and 13. In other aspect, the turbulators 21 are arranged in the first channel 18 in an in-line pattern (not shown in figures). The turbulators 21 are arranged in the first channel 18 in such a pattern that said turbulators 21 at least partially overlap each other. In one aspect adjacent turbulators 21 are arranged in the overlapping pattern, as shown in FIGS. 8 and 13. In other aspect, every second turbulators 21 are arranged in the overlapping pattern. The arrangement of the turbulators 21 in the first channel 18 increases further turbulence in the first cooling air jet stream, enhancing thereby cooling efficiency.

The first cavity 19*a* and the second cavity 19*b* of the second channel 19 of the cooling flow passage 12 are provided with pin fins 23 for dissipating the second cooling air jet stream in said second channel 19 for enhancing further cooling efficiency of the nozzle airfoil 10. The pin fins 23 are longitudinal protrusions extending substantially perpendicularly from a curved inner wall 11*a* of the pressure sidewall 7 and/or a curved inner wall 11*b* of the suction sidewall 8, as shown in FIG. 7. In aspects, the pin fins 23 extend in span between the inner walls 11*a*, 11*b* of the pressure sidewall 7 and the suction sidewall 8, respectively. The pin fins 23 are arranged in parallel to each other, as shown in FIGS. 5 and 7. In non-limiting aspects, the pin fins 23 are arranged further in parallel to the first integral rib 15, the second integral rib 16 and third integral rib 17, as shown in FIGS. 5 and 7. A cross section of the pin fins 23 is selected from a group comprising circular, elliptical, rectangular, pentagonal, hexagonal cross section. The pin fins 23 have substantially circular cross section, as shown in FIGS. 3 and 12. In an aspect, the pin fins 23 are arranged in a staggered pattern, as shown in FIG. 3. The staggered arrangement of the pin fins 23 provides uniform dissipation of the second cooling air jet stream in the second channel 19 and prevents from forming dead zones in said second channel 19. In another aspect, the pin fins 23 are also arranged in an in-line pattern (not shown in figures).

The first cavity 19*a* and the second cavity 19*b* of the second channel 19 of cooling flow passage 12 are provided further with half-pin fins 23*a*. The half-pin fins 23*a* are arranged on inner walls of the first integral rib 15, the second integral rib 16 and third integral rib 17, as shown in FIGS. 3 and 12. The half-pin fins 23*a* are provided for stripping the second cooling air jet stream of the inner walls of the first integral rib 15, the second integral rib 16 and third integral rib 17 in the first cavity 19*a* and the second cavity 19*b*, respectively, enhancing yet further cooling efficiency of the nozzle airfoil 10. Analogously to the pin fins 30 23, the half-pin fins 23*a* are longitudinal protrusions extending substantially perpendicularly from a curved inner wall 11*a* of the pressure sidewall 7 and/or a curved inner wall 11*b* of the suction sidewall 8, along the inner walls of the first integral rib 15, the second integral rib 16 and third integral rib 17 in the first cavity 19*a* and the second cavity 19*b*, respectively. In aspects the half-pin fins 23*a* extend in span between the inner walls 11*a*, 11*b* of the pressure sidewall 7 and the suction sidewall 8, respectively, as shown in FIG. 13. A half cross section of the half-pin fins 23*a* is selected from a group comprising circular, elliptical, rectangular, pentagonal, hexagonal half cross section. The half-pin fins 23*a* have substantially half circular cross section, as shown in FIGS. 3 and 12. In an aspect, the half-pin fins 23*a* and the pin fins 23 are arranged in a staggered pattern, as shown in FIG. 3. In another aspect, the pin fins 23*a* are arranged in an inline pattern with the pin fins 23 (not shown in figures).

Figure 10:
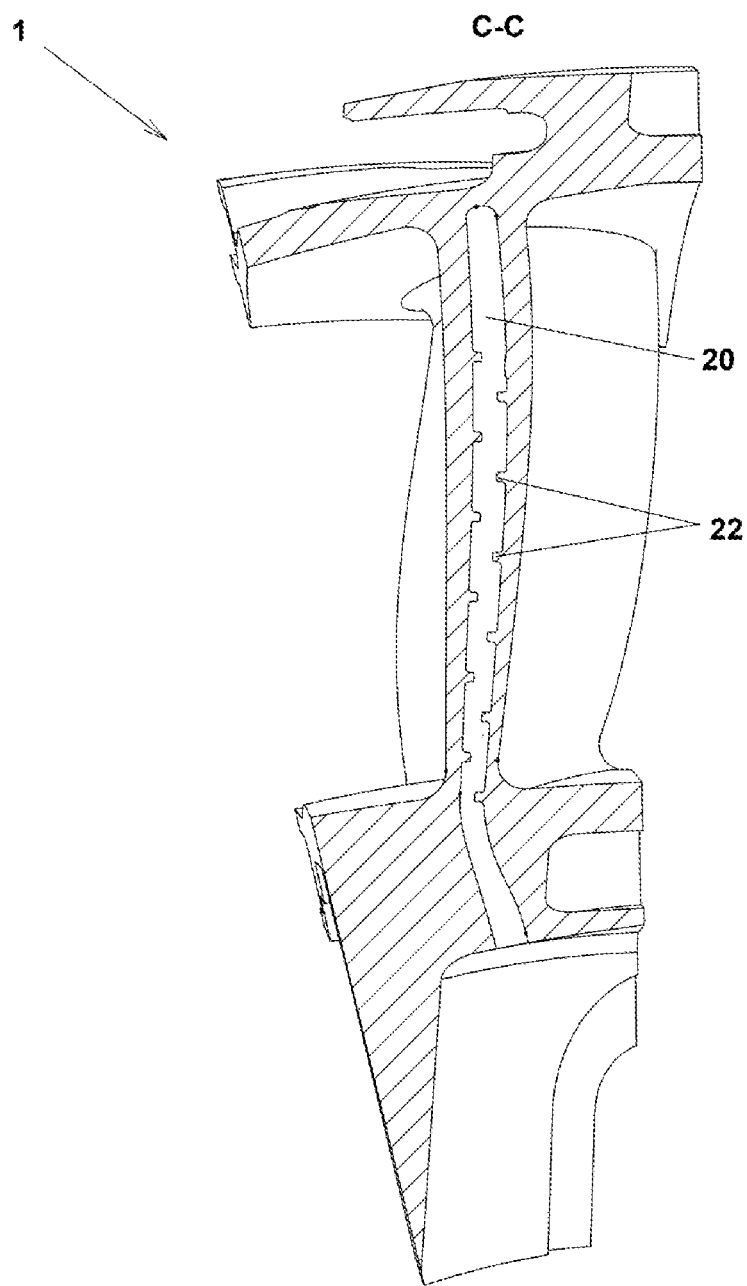
FIG. 10 shows a cross-section view of the third cavity of the second channel of the turbine nozzle segment according to aspects described herein, taken along the line C-C in FIG. 3.

The nozzle airfoil 10 comprises turbulators 22 arranged within the third cavity 20 of the second channel 19 of the flow cooling passage 12. Analogously to the turbulators 21 of the first channel 18, the turbulators 22 of the second channel 19 are provided for stripping of a boundary layer along inner walls of the third cavity 20 and for accelerating and swirling cooling air of the second cooling jet stream within the second channel 19, increasing thereby further cooling efficiency of the nozzle airfoil 10. The number and the orientation of the turbulators 21 are selected according to the needs. The parameters taken into consideration when determining the number of the turbulators 22 in the third cavity 20 of the second channel 19 are spacing S and blockage B. The spacing S and blockage B are defined in the same way and comply the same relationships, as described in detail above for the turbulators 21 of the first channel 18. For the third cavity 20 of the second channel 19 of the turbine nozzle segment 1 according to non-limiting aspects, the spacing S is in a range from about 4% to about 14%, preferably from about 6% to about 12%, whereas the blockage B is in a range from about 30% to about 40%, preferably is about 30%. The number of the turbulators 22 for the third cavity 20 of the second channel 19 of the nozzle airfoil 10 according to non-limiting aspects is in the range 8 to 16, more preferably is in a range from 10 to 14. In an aspect, the third cavity 20 of the second channel 19 comprises twelve turbulators 22, as shown in FIGS. 3, 8 and 13. The turbulators 22 are arranged in the third cavity 20 of the second channel 19 in an inclined pattern, as shown in FIGS. 3, 8 and 13. The turbulators 22 are inclined to the third integral rib 17 at an angle in a range from about 40° to about 90°. In one aspect, the turbulators 22 are inclined at an angle about 60°, as shown in FIG. 3. In another aspect, the turbulators 22 are inclined at an angle about 45°. In yet another aspect, the turbulators 22 are inclined at an angle about 90°. The turbulators 22 are arranged in the third cavity 20 in a staggered pattern, as shown in FIGS. 10 and 13. In other aspects, the turbulators 22 are arranged in the third cavity 20 of the second channel 19 in an in-line pattern (not shown in figures). The turbulators 22 are arranged in the third cavity 20 in such a pattern that said turbulators 22 at least partially overlap each other. In one aspect, adjacent turbulators 22 are arranged in the overlapping pattern, as shown in FIG. 10. In other aspect, every second turbulators 22 are arranged in the overlapping pattern. The arrangement of the turbulators 22 in the third cavity 20 of the second channel 19 increases further turbulence in the second cooling air jet stream, enhancing thereby cooling efficiency of the nozzle airfoil 10.

In an aspect, the nozzle airfoil 10 is provided with a vertical turbulator 29. The vertical turbulator 29 is arranged in the second channel 19 of the internal cooling system. The vertical turbulator 29 extends from the third integral rib 17 towards the outer band 2 of the nozzle segment 1 between the second cavity 19*b* and the third cavity 20 of the second channel 19, respectively, as shown in FIG. 3. The vertical turbulator 29 is arranged on the inner wall of the suction sidewall 8. The vertical turbulator 29 is provided for turbulating the second cooling air jet stream within the end of the second cavity 19*b* and the beginning of third cavity 20 of the second channel 19, enhancing thereby cooling efficiency of the suction sidewall 8 within the vertical turbulator 29.

In an aspect, the first cooling air outlet 24 is an ejector for providing purging air to a cavity of an inter-stage disc (not shown in figures) for cooling rotating parts of the turbine. The ejector comprises an outlet at an angle optimized to control circumferential velocity of a cooling air flow in a rotor cavity to decrease friction losses called as "windage losses".

In an aspect, the nozzle airfoil 10 comprises a set of outlet holes. The outlet holes are arranged on the leading edge 4, the pressure sidewall 7 and the suction sidewall 8. The outlet holes are in a fluid communication with the first channel 18 and/or the second channel 19 of the cooling flow passage 12, respectively. Cooling air discharged through the outlet holes forms a thin film of the cooling air on the leading edge 4, the pressure sidewall 7 and the suction sidewall 8, respectively, enhancing thereby cooling the external surface of the nozzle airfoil 10. In an aspect, the outlet holes are arranged on the leading edge 4 and provide "showerhead cooling".

Generally, cooling air for cooling the turbine nozzle segment 1 is provided by the compressor of the gas turbine engine. Cooling air is provided to the outer band 2 by a feeding system for delivering cooling air, the feeding system being arranged upstream to the turbine nozzle segment 1 (not shown in figures). The cooling air inlet 9 is in a fluid communication with the cooling air feeding system. In one aspect, cooling air is provided at the cooling air inlet 9, wherein said cooling air inlet 9 is configured to feed cooling air into the cooling flow passage 12 at a velocity, as specified above. In another aspect, cooling air is provided already as a cooling air jet stream having a velocity, as specified above. In an aspect, the cooling air feeding system is the system disclosed in the US patent application No. US 2019/0071994 A1, of the present Applicant, the disclosure of which in its entirety is enclosed herewith by way of a reference.

When the turbine nozzle segment 1 is assembled in the turbine of the gas turbine engine and operating, cooling air is provided to the cooling air inlet 9 in the outer band 2 for feeding said cooling air into said turbine nozzle segment 1. In one aspect, cooling air is fed to the cooling air inlet 9 as a cooling air flow and accelerated by said cooling air inlet 9 to high velocity forming a cooling air jet stream. In another aspect, cooling air is provided to the cooling air inlet 9 already as a cooling air jet stream having high velocity.

Cooling air is transported through the cooling air inlet 9 into the cooling flow passage 12 of the internal cooling system as the cooling air jet stream 13 at a velocity equal or over about 0.1 Mach, preferably at a velocity in a range of about 0.2 to about 0.3 Mach. The cooling air jet stream 13 is fed into the cooling flow passage 12 through the cooling air inlet 9 substantially along the main axis O. In an aspect, the cooling air jet stream 13 is fed into the cooling flow passage 12 along the main axis O of the cooling air inlet 9, said main axis O being parallel to the longitudinal direction of the nozzle airfoil 10. The cooling air jet stream 13 is directed on the deflector 14. The cooling air jet stream 13 hits the deflector 14 and is divided into the first cooling air jet stream and the second cooling air jet stream.

The first cooling air jet stream is directed into the first channel 18 of the cooling flow passage 12 of the turbine nozzle segment 1. The first cooling air jet stream is deflected on the surface of the deflector 14 and directed into the first channel 18 so that said first cooling air jet stream hits the leading edge 4 and the suction sidewall 8 in a vicinity of said leading edge 4. The first cooling air jet stream is deflected on the deflector 14 at an angle α and hits the leading edge 4 and the suction sidewall 8 in the vicinity of said leading edge 4 inside the first channel of the cooling flow passage 12 of the nozzle segment 1. As a consequence, the first cooling air jet stream hits the suction side wall 8 at an acute angle, as considered in a lateral cross section of the nozzle airfoil 10 and as shown in FIG. 6. The angle α is in a range from about 5° to about 60°, preferably 15° to about 40°, more preferably is about 30°. At the same time the first cooling air jet stream is deflected on the deflector 14 at an angle β and hits the leading edge 4 and the suction sidewall 8 in the vicinity of said leading edge 4 inside the first channel 18 of the cooling flow passage 12 of the nozzle segment 1 at least at the level of the deflector 14. As a consequence, the first cooling air jet stream hits the suction side wall 8 at an acute angle as well, as considered in a longitudinal cross section of the nozzle airfoil 10 and as shown in FIG. 4. The angle β is in a range from about 5° to about 60°, preferably 10° to about 50°, more preferably is about 30°. The first cooling air jet stream hits, therefore, the suction sidewall 8 obliquely, as seen in FIGS. 4 and 6. In an aspect, the first cooling air jet stream hits, therefore, the suction sidewall 8 of the first cooling air jet stream hits obliquely the suction sidewall 8 and below the deflector 14, as seen in FIGS. 4, 6 and 14. The configuration of impinging of the first cooling air jet stream promotes further flow of said first cooling air jet stream downstream of the first channel 18 of the cooling flow passage 12 of the nozzle segment 1. The first cooling air jet stream impinging at high velocity the leading edge 4 and the suction sidewall 8 is further transported along the first channel 18 with swirling motion, as shown in FIG. 14. In other words, feeding the first cooling air jet stream into the first channel 18, as described above, generates turbulent and swirling flow of cooling air along said first channel 18, cooling thereby efficiently hot areas of the nozzle airfoil 10, namely hot areas located on the leading edge 4, neighboring pressure sidewall 7 and suction sidewall 8. The swirling flow of the first cooling air jet stream provides intense and uniform mixing of cooling air in the first channel 18 providing efficient cooling. The first cooling air jet stream flowing along the first channel 18 is also turbulated on the turbulators 21 arranged in said first channel 18. The turbulators 21 cause stripping the boundary layer of cooling air of the inner walls of the first channel 18, enhancing thereby further cooling efficiency within said first channel 18.

Cooling air of the first cooling air jet stream exits the first channel 18 of the cooling flow passage 12 through the first cooling air outlet 24 in the inner band 3. Cooling air of the first cooling air jet stream is directed to other components of the turbine of the gas turbine engine. In one aspect, the first cooling jet stream is discharged through the first cooling air outlet 24 being the ejector, as described above, and directed to a rotor cavity as a cooling air flow for decreasing therein windage losses.

The second cooling air jet stream is directed into the second channel 19 of the cooling flow passage 12 of the turbine nozzle segment 1, as shown in FIG. 14. The second cooling air jet stream enters the first cavity 19a of the second channel 19 first. The second cooling air jet stream dissipates in the first cavity 19a on the pin fins 23 and the half-pin fins 23a. Cooling air entering the first cavity 19a in the second jet stream and flowing around the pin fins 23 and the half-pin fins 23a is transported along said first cavity 19a with local whirls and changes of flow directions of said cooling air in the second cooling air jet stream, providing thereby efficient cooling of the mid-chord areas 5 of the nozzle airfoil 10 located farther to the leading edge 4. The half-pin fins 23a cause also stripping the boundary layer of cooling air of the inner walls of the first integral rib 15 and the second integral rib 16, enhancing thereby further cooling efficiency within said first cavity 19a of the second channel 19.

The second cooling air jet stream exits the first cavity 19a and meanders into the second cavity 19b of the second channel 19 of the cooling flow passage 12. The second cooling air jet stream dissipates in the second cavity 19b on the pin fins 23 and the half-pin fins 23a in the same way as in the first cavity 19a. Namely, cooling air entering the second cavity 19b in the second cooling air jet stream and flowing around the pin fins 23 and the half-pin fins 23a is transported along said second cavity 19b with local whirls and changes of flow directions of said cooling air in the second cooling air jet stream, providing thereby efficient cooling the mid-chord areas 5 of the nozzle airfoil 10 located substantially in the middle of the nozzle airfoil 10. Analogously, the half-pin fins 23a cause also stripping the boundary layer of cooling air of the inner walls of the second integral rib 16 and the third integral rib 17, further enhancing thereby cooling efficiency within said second cavity 19b of the second channel 19.

The cooling air jet stream exits the second cavity 19b and meanders farther into the third cavity 20 of the second channel 19 of the cooling flow passage 12. The second cooling air jet stream enters the third cavity 20 at a velocity lower than the velocity of said the second cooling air jet stream at the entrance to the first cavity 19a of the second channel 19. Therefore, formally cooling air of the second cooling air jet stream entering the second channel 19 of the internal cooling system enters the third cavity 20 of said second channel 19 as the second cooling air stream. Cooling air of the second cooling stream flows farther along the third cavity 20 of the second channel 19. The second cooling air stream flowing along the third cavity 20 of the second channel 19 turbulates also on the turbulators 22 arranged in said third cavity 20. Analogously to the turbulators 21 in the first channel 18, the turbulators 22 of the second channel 19 cause stripping the boundary layer of cooling air of the inner walls of the third cavity 20, enhancing thereby cooling efficiency within said third cavity 20.

Cooling air of the second cooling air stream exits the third cavity 20 of the second channel 19 of the nozzle airfoil 10 through the cooling bores 26 arranged in the trailing edge 6, cooling thereby efficiently another of the hot areas of said nozzle airfoil 10, namely the hot areas located on the trailing edge 6, and neighboring pressure sidewall 7 and suction sidewall 8.

The meandering second channel 19 of the cooling flow passage 12 of the internal cooling system, as described above, provides even distribution of flowing cooling air within said second channel 19, providing thereby efficient cooling of the turbine nozzle segment 1, especially the nozzle airfoil 10.

In an aspect, comprising the vertical turbulator 29, as described above, cooling air traveling from the second cavity 19b to the third cavity 20 of the second channel 19 turbulates on said vertical turbulator 29, enhancing thereby further cooling efficiency of the suction sidewall 8 around the vertical turbulator 29.

In another aspect, comprising set of outlet holes, as described above, cooling air is discharged from the first channel 18 and/or the second channel 19 of the cooling flow passage 12 through said outlet holes and forms a thin film on the external walls of the nozzle airfoil 10. The thin film of cooling air flows substantially laminarly on the external walls of the nozzle airfoil 10, preventing said external walls from contact with hot combustion gases and providing a showerhead cooling of the nozzle airfoil 10.

In one aspect, the turbine nozzle segment 1 is manufactured as a singlet. The singlet comprises an outer band 2, an inner band 3 and a nozzle airfoil 10, as described above and shown in figures. In other aspect, the turbine nozzle segment 1 is manufactured as a doublet (not shown in figures). The doublet comprises an outer band 2, and inner band 3 and two nozzle airfoils 10. The outer band 2 and inner band 3, respectively, are common for the two airfoils 10 in the doublet. The nozzle airfoils 10 in the doublet extend radially between the outer band 2 and the inner band 3 in a neighboring arrangement. In yet other aspect, the turbine nozzle segment 1 is manufactured as a triplet (not shown in figures). The triplet comprises an outer band 2, and inner band 3 and three nozzle airfoils 10. The outer band 2 and inner band 3, respectively, are common for all the nozzle airfoils 10 in the triplet. Analogously, the nozzle airfoils 10 in the triplet extend radially between the outer band 2 and the inner band 3 in an neighboring arrangement. The nozzle airfoils 10 in the doublet and triplet are as described above and shown in figures.

Figure 15:
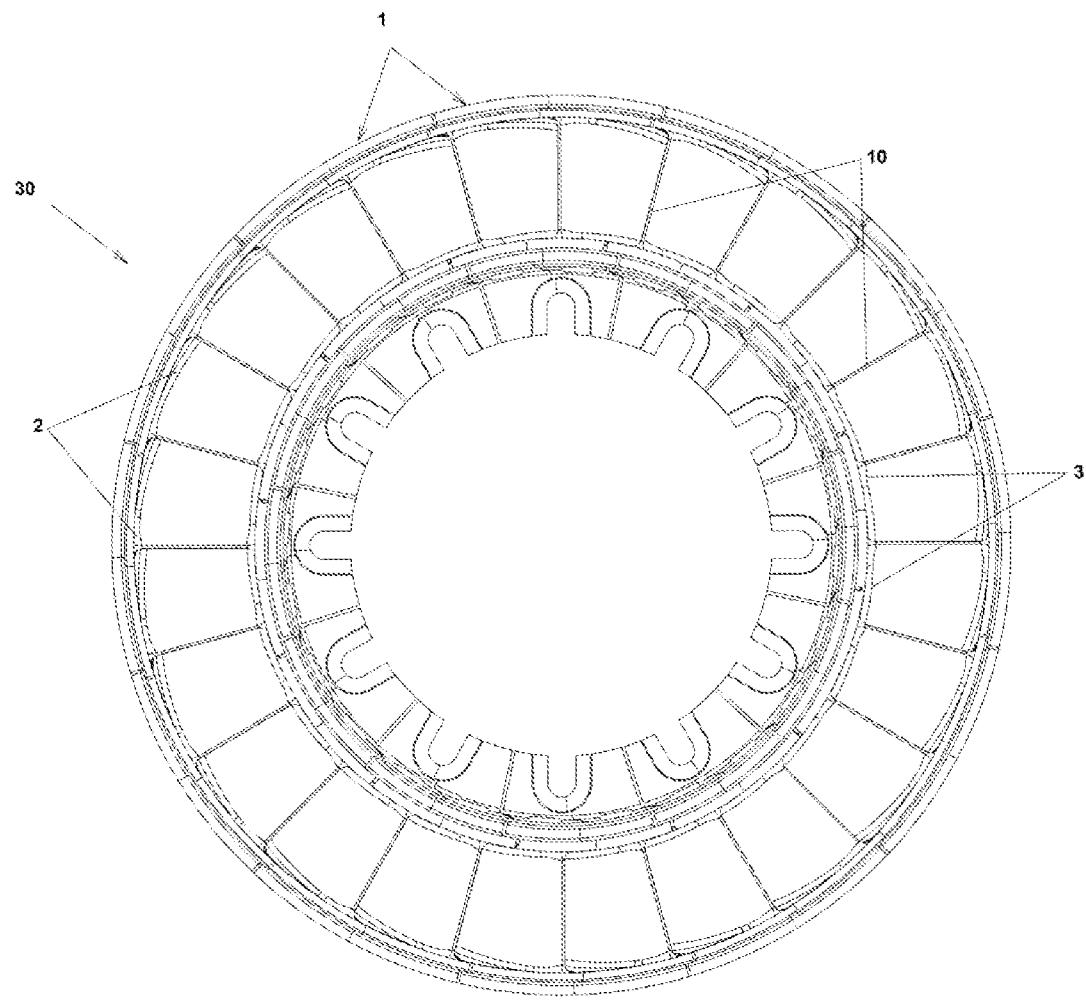
FIG. 15 shows a front view of the turbine nozzle assembly, according to aspects described herein, looking at a trailing edge side.

The turbine airfoil 10 according to an aspect are assembled into a turbine nozzle for a HPT. The turbine nozzle for the HPT comprising the turbine nozzle segments 1 according to an aspect is shown in FIG. 15. The turbine nozzle according to an aspect is used in the gas turbine engine in the second stage of the HPT.

Providing cooling air into the cooling flow passage 12 of the turbine nozzle segment 1 in a form of a cooling air jet stream 13 and directing divided therefrom the first cooling air jet stream to the areas of the first channel 18 of said segment, as described above, wherein cooling air of the first cooling air jet stream transported along said the first channel 18 in a swirled flow, as described above, provides highly efficient cooling of the turbine nozzle, especially highly efficient cooling of the nozzle airfoils 10. The turbine nozzle segment 1 is effectively usable in a turbine nozzle in a contact with the hottest combustion gases exhausted from a combustor. Therefore, the turbine nozzle segment 1 is especially usable for a turbine nozzle for a HPT. The turbine nozzle segment 1 according to an aspect is effectively cooled down to the operational temperatures, ensuring thereby intended operational life of a turbine of a gas turbine engine. Because of the improved cooling of the turbine nozzle segment 1, less amount of cooling air is needed to maintain the operational temperature of the turbine nozzle, especially the nozzle airfoil 10 of said turbine nozzle. Therefore, less cooling air for cooling the turbine is necessary to bled from a compressor, reducing thereby loss of efficiency of a gas turbine engine. Because of the improved cooling of the turbine nozzle segment 1, a turbine nozzle is successfully downsized and is usable in a small gas turbine engine.

To the extent not already described, the different features and structures of the various aspects can be used in combination with each other as desired. That one feature is not illustrated in all of the aspects is not meant to be construed that it may not be, but is done for brevity of description. Thus, the various features of the different aspects may be mixed and matched as desired to form new aspects, whether or not the new aspects are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

A nozzle segment for a gas turbine engine comprising: an outer band comprising a cooling air inlet, an inner band comprising a first cooling air outlet, at least one nozzle airfoil comprising a pressure sidewall, a suction sidewall, a leading edge and a trailing edge, wherein the pressure sidewall and the suction sidewall are spaced apart and extend in span between the outer band and the inner band and in chord between a leading edge and a trailing edge, the nozzle airfoil comprises a cooling bores arranged within the trailing edge, a cooling flow passage arranged at least within the nozzle airfoil for cooling said nozzle airfoil with cooling air, wherein the cooling flow passage is in a fluid communication with the cooling air inlet for delivering cooling air into the cooling flow passage as a cooling air stream, a first integral rib protruding from the inner band and arranged spaced apart from the leading edge for defining a first channel and a second channel within the cooling flow passage, the first channel is arranged along the leading edge and is in a fluid communication with the first cooling air outlet for discharging cooling air from the first channel of the cooling flow passage, the second channel is at least in part arranged along the trailing edge and is in a fluid communication with the cooling bores for discharging cooling air from the second channel of the cooling flow passage, a deflector arranged at the end of the first integral rib and configured for dividing flow of the cooling air stream received through the cooling air inlet into a first cooling air stream and a second cooling air stream and for directing the first cooling air stream into the first channel and for directing the second cooling air stream into the second channel, respectively, characterized in that the cooling air stream received through the cooling air inlet is a cooling air jet stream, wherein the first cooling air stream and the second cooling air stream divided by the deflector are a first cooling air jet stream and the second cooling air jet stream, respectively, wherein the deflector is configured to deflect the first cooling air jet stream obliquely to the suction sidewall in the first channel of the cooling flow passage of the nozzle segment, and the first channel is configured to transport the first cooling air jet stream along said first channel in a swirly flow.

The nozzle segment in accordance with the preceding clause, wherein the first cooling air jet stream is deflected by the deflector to impinge the suction sidewall in the first channel at an acute angle laterally and at an acute angle longitudinally, respectively.

The nozzle segment in accordance with any preceding clause, wherein the first cooling air jet stream is deflected by deflector towards the suction sidewall in the first channel at an longitudinal angle (α) and independently at lateral angle (β) with respect to the deflector.

The nozzle segment in accordance with any preceding clause, wherein the angle (α) is in a range from about 5° to about 60°, preferably from about 15° to about 40°, more preferably is about 30°, and independently the angle (β) is in a range from about 5° to about 60°, preferably 10° to about 50°, more preferably is about 30°.

The nozzle segment in accordance with any preceding clause, wherein the cooling air jet stream impinging the deflector has a velocity equal or over about 0.1 Mach, preferably is in a range of about 0.2 to about 0.3 Mach.

The nozzle segment in accordance with any preceding clause, comprising further a second integral rib protruding from the outer band and arranged spaced apart from the first integral rib defining a first cavity in the second channel, the first cavity is in a fluid communication with the cooling air inlet, and the third integral rib protruding from the inner band defining a second cavity and a third cavity, the second cavity is in a fluid communication with the first cavity, the third cavity is in a fluid communication with the second cavity and the third cavity is in a fluid communication with the cooling bores on the trailing edge of the nozzle airfoil.

The nozzle segment in accordance with any preceding clause, wherein the first cavity (19a), the second cavity and the third cavity are arranged within the second channel in a meandric arrangement.

A nozzle for a gas turbine engine comprising at least one nozzle segment according to any preceding clause.

A gas turbine engine comprising a nozzle according to the preceding clause.

The invention claimed is:
1. A nozzle segment for a gas turbine engine comprising:
an outer band comprising a cooling air inlet defining an inlet main axis,
an inner band comprising a first cooling air outlet,
at least one nozzle airfoil comprising a pressure sidewall, a suction sidewall, a leading edge and a trailing edge, wherein the pressure sidewall and the suction sidewall are spaced apart and extend in span between the outer band and the inner band and in chord between a leading edge and a trailing edge, the nozzle airfoil comprises a cooling bore arranged within the trailing edge,
a cooling flow passage arranged at least within the nozzle airfoil for cooling said nozzle airfoil with cooling air, wherein the cooling flow passage is in a fluid communication with the cooling air inlet for delivering cooling air into the cooling flow passage as a cooling air stream,
a first integral rib protruding from the inner band and arranged spaced apart from the leading edge for defining a first channel and a second channel within the cooling flow passage,
the first channel is arranged along the leading edge and is in a fluid communication with the first cooling air outlet for discharging cooling air from the first channel of the cooling flow passage,
the second channel is at least in part arranged along the trailing edge and is in a fluid communication with the cooling bores for discharging cooling air from the second channel of the cooling flow passage,
a deflector arranged at the end of the first integral rib and configured for dividing flow of the cooling air stream received through the cooling air inlet into a first cooling air stream and a second cooling air stream and for directing the first cooling air stream into the first channel and for directing the second cooling air stream into the second channel, respectively, the deflector comprising a distal tip that is laterally offset from the inlet main axis toward the trailing edge;
wherein the cooling air stream received through the cooling air inlet is a cooling air jet stream, wherein the first cooling air stream and the second cooling air stream divided by the deflector are a first cooling air jet stream and the second cooling air jet stream, respectively, wherein the deflector has a surface confronting the cooling air inlet and faced toward the suction sidewall to deflect the first cooling air jet stream obliquely to the suction sidewall in the first channel of the cooling flow passage of the nozzle segment, and impart a swirl to the first cooling air jet stream; and wherein the first channel transports the swirling first cooling air jet stream.

2. A nozzle segment according to claim 1, wherein the first cooling air jet stream is deflected by the deflector to impinge the suction sidewall in the first channel at an acute angle laterally and at an acute angle longitudinally, respectively.

3. A nozzle segment according to claim 1, wherein the first cooling air jet stream is deflected by deflector towards the suction sidewall in the first channel at a longitudinal angle (α) and independently at lateral angle (β) with respect to the deflector.

4. A nozzle segment according to claim 3, wherein the angle (α) is in a range from about 5° to about 60°, and independently the angle (β) is in a range from about 5° to about 60°.

5. A nozzle segment according to claim 1, wherein the cooling air jet stream impinging the deflector has a velocity equal or over about 0.1 Mach.

6. A nozzle segment according to claim 1, comprising further a second integral rib protruding from the outer band and arranged spaced apart from the first integral rib defining a first cavity in the second channel, the first cavity is in a fluid communication with the cooling air inlet, and a third integral rib protruding from the inner band defining a second cavity and a third cavity, the second cavity is in a fluid communication with the first cavity, the third cavity is in a fluid communication with the second cavity and the third cavity is in a fluid communication with the cooling bores on the trailing edge of the nozzle airfoil.

7. A nozzle segment according to claim 6, wherein the first cavity, the second cavity and the third cavity are arranged within the second channel in a meandric arrangement.

8. A nozzle for a gas turbine engine comprising at least one nozzle segment according to claim 1.

9. A gas turbine engine comprising a nozzle according to claim 8.

10. The nozzle for a gas turbine engine according to claim 1, further comprising a set of first turbulators disposed spanning the first channel.

11. The nozzle for a gas turbine engine according to claim 10, wherein the first turbulators are inclined with respect to the first integral rib at an angle in a range from about 40° to about 90°.

12. The nozzle for a gas turbine engine according to claim 10, wherein the first turbulators are arranged in a staggered pattern with respect to each other.

13. The nozzle for a gas turbine engine according to claim 6, further comprising a set of pin fins disposed in the second channel.

14. The nozzle for a gas turbine engine according to claim 13, wherein the pin fins extend from at least one of an inner wall of the pressure sidewall and an inner wall of the suction sidewall.

15. The nozzle for a gas turbine engine according to claim 13, further comprising a set of protrusions arranged on the first integral rib, the second integral rib, and the third integral rib.

16. The nozzle for a gas turbine engine according to claim 6, further comprising a set of second turbulators arranged within the third cavity.

17. The nozzle for a gas turbine engine according to claim 16, wherein the second turbulators are inclined with respect to the third integral rib at an angle in a range from about 40° to about 90°.

18. The nozzle for a gas turbine engine according to claim 16, wherein the second turbulators are arranged in a staggered pattern with respect to each other.

19. The nozzle for a gas turbine engine according to claim 6, further comprising a vertical turbulator disposed in the second channel.

20. The nozzle for a gas turbine engine according to claim 19, wherein the vertical turbulator extend from the third integral rib between the second cavity and the third cavity.

* * * * *